United States Patent
Gu

(10) Patent No.: US 10,230,960 B2
(45) Date of Patent: Mar. 12, 2019

(54) VIDEO CODING DEVICE, METHOD, AND APPARATUS AND INTER-FRAME MODE SELECTION METHOD AND APPARATUS THEREFOR

(71) Applicant: Tencent Technology (Shenzhen) Company Limited, Shenzhen, Guangdong (CN)

(72) Inventor: Chenchen Gu, Guangdong (CN)

(73) Assignee: TENCENT TECHNOLOGY (SHENZHEN) COMPANY LIMITED, Guangdong P.R., Shenzhen (CN)

( * ) Notice: Subject to any disclaimer, the term of this patent is extended or adjusted under 35 U.S.C. 154(b) by 52 days.

(21) Appl. No.: 15/373,244

(22) Filed: Dec. 8, 2016

(65) Prior Publication Data

US 2017/0094286 A1 Mar. 30, 2017

Related U.S. Application Data

(63) Continuation of application No. PCT/CN2015/081191, filed on Jun. 10, 2015.

(30) Foreign Application Priority Data

Jun. 10, 2014 (CN) .......................... 2014 1 0256916

(51) Int. Cl.
*H04N 19/159* (2014.01)
*H04N 19/119* (2014.01)
(Continued)

(52) U.S. Cl.
CPC ......... *H04N 19/159* (2014.11); *H04N 19/119* (2014.11); *H04N 19/15* (2014.11);
(Continued)

(58) Field of Classification Search
None
See application file for complete search history.

(56) References Cited

U.S. PATENT DOCUMENTS

| | | |
|---|---|---|
| 2011/0164677 A1 | 7/2011 | Lu et al. |
| 2011/0170593 A1 | 7/2011 | Kim et al. |

(Continued)

FOREIGN PATENT DOCUMENTS

| | | |
|---|---|---|
| CN | 102984521 A | 3/2013 |
| CN | 103051896 A | 4/2013 |

(Continued)

OTHER PUBLICATIONS

Xiaohai et al., High-efficiency video coding inter-frame mode judging method based on temporal relativity—Translation for CN102984521 (A).*

(Continued)

*Primary Examiner* — Anand S Rao
*Assistant Examiner* — Samuel D Fereja
(74) *Attorney, Agent, or Firm* — Sughrue Mion, PLLC

(57) ABSTRACT

An inter-frame mode selection method for video coding and apparatus, and video coding method are disclosed, and the inter-frame mode selection method includes: step (a): determining a current optimum coding mode and coding overhead of a coding unit $CU_{Depth}$ in a current depth Depth; step (b): dividing $CU_{Depth}$ into multiple coding subunits having a depth Depth+1, recursively performing step (a) to (d) for each of coding subunits to determine an optimum coding mode and coding overhead of each coding subunit; step (c): comparing a sum of coding overheads of the multiple coding subunits with the current coding overhead of $CU_{Depth}$; and step (d): if the current coding overhead of $CU_{Depth}$ is greater than the sum, determining that an optimum coding mode of $CU_{Depth}$ is an optimum coding mode after dividing $CU_{Depth}$ (Continued)

into multiple coding subunits; otherwise, determining that an optimum coding mode of $CU_{Depth}$ is an optimum coding mode before dividing $CU_{Depth}$ into multiple coding subunits.

9 Claims, 9 Drawing Sheets

(51) Int. Cl.
*H04N 19/176* (2014.01)
*H04N 19/192* (2014.01)
*H04N 19/15* (2014.01)
*H04N 19/96* (2014.01)
*H04N 19/50* (2014.01)
*H04N 19/503* (2014.01)
*H04N 19/172* (2014.01)

(52) U.S. Cl.
CPC ......... *H04N 19/176* (2014.11); *H04N 19/192* (2014.11); *H04N 19/50* (2014.11); *H04N 19/96* (2014.11); *H04N 19/172* (2014.11); *H04N 19/503* (2014.11)

(56) References Cited

U.S. PATENT DOCUMENTS

2012/0327999 A1 12/2012 Francois et al.
2016/0191920 A1* 6/2016 Kim .................... H04N 19/176
   375/240.13

FOREIGN PATENT DOCUMENTS

| CN | 103067704 A | 4/2013 |
| CN | 103596003 A | 2/2014 |
| CN | 103813178 A | 5/2014 |
| CN | 104602017 A | 5/2015 |
| WO | WO-2015188754 A1 | 12/2015 |

OTHER PUBLICATIONS

International Search Report & Written Opinion of the ISA for PCT/CN2015/081191, Haidian District, Beijing, dated Aug. 24, 2015.
First Chinese Office Action regarding Application No. 201410256916.3 dated May 3, 2017. English translation provided by http://globaldossier.uspto.gov.

* cited by examiner

| Sub-CU 1 | Sub-CU 2 |
|---|---|
| Sub-CU 3 | Sub-CU 4 |

FIG. 5

VIDEO CODING DEVICE, METHOD, AND APPARATUS AND INTER-FRAME MODE SELECTION METHOD AND APPARATUS THEREFOR

CROSS-REFERENCE TO RELATED APPLICATIONS

This application is a continuation of International Application No. PCT/CN2015/081191, filed on Jun. 10, 2015, which claims priority to Chinese Patent Application No. 201410256916.3, filed on Jun. 10, 2014, both of which are hereby incorporated by reference in their entireties.

FIELD OF THE TECHNOLOGY

The present disclosure relates to the field of computer technologies and the internet, and in particular, to a video coding device, method, and apparatus and an inter-frame mode selection method and apparatus therefor.

BACKGROUND OF THE DISCLOSURE

With obvious advantages over previous video compression standards in aspects of compression efficiency and network adaptability, the H.264/AVC video coding standard quickly becomes a mainstream standard in the field of video applications since a draft thereof is released in May, 2003. However, with the diversification of forms of terminal devices and the continuous increase of requirements of people on multimedia experience, high definition, high frame rate, 3D, and mobile platforms have already become main trends of video applications. In another aspect, transmission bandwidths and storage space have always been the most crucial resources in video applications, and how to acquire the best video experience with limited space and transmission paths has always been a goal unremittingly pursued by users. Compression efficiency of the existing H.264/AVC coding standard still cannot satisfy these increasing requirements. Therefore, in January, 2010, the video Coding Experts Group (ITU-T VCEG) and the Moving Picture Experts Group (ISO/IEC MPEG) jointly established a Joint Collaborative Team on Video Coding (JCT-VC), who jointly formulated the next-generation coding standard High Efficiency Video Coding (HEVC) and officially released a final edition of the standard in January, 2013. The HEVC still uses a hybrid coding framework of the H.264/AVC, and also uses a great number of new technologies, so that coding efficiency is increased to twice that of the existing H.264/AVC, that is, the HEVC can achieve the same video quality as the H.264/AVC with a bit rate only half that of the H.264/AVC. Therefore, the HEVC has great application value in aspects such as high-definition and ultra-high-definition video storage, streaming media, and mobile internet videos.

One of the most important new technologies in the HEVC standard is the adoption of a more flexible quadtree coding structure, and an entire coding process is described by using three conceptions: coding unit (CU), prediction unit (PU), and transform unit (TU), so as to improve compression coding efficiency of high-definition and ultra-high-definition videos.

In the HEVC, a frame picture is divided into many non-overlapping coding tree units (CTU). The CTU is similar to a macroblock in the H.264/AVC. All the CTUs are square pixel blocks having a size of 2N×2N (where N=2C, and C is an integer greater than 1), and an allowed maximum size of the CTU is 64×64. Each CTU can be recursively divided into square coding units according to the quadtree structure. The CU is a basic unit for HEVC coding, an allowed minimum size is 8×8, and a maximum size is a size of the CTU. FIG. 1 shows an example of division of a 64×64 CTU quadtree structure. A depth (Depth) of a CU whose size is equal to that of a CTU is marked as 0. If a CU having a depth n can be further divided into 4 coding subunits having a depth equal to n+1, a size of each coding subunit is ¼ that of the CU having the previous depth. There are two predictive coding types of CUs: an intra-frame (Intra) prediction mode and an inter-frame (Inter) prediction mode. A frame whose CUs are all in an intra-frame prediction mode is referred to as an intra-frame predictive frame (that is, an I frame), and a frame including both a CU in an intra-frame prediction mode and a CU in an inter-frame prediction mode is referred to as an inter-frame predictive frame (that is, a GPB frame or a B frame).

A PU is a basic unit for prediction. One CU may include one or multiple Pus. A maximum size of the PU is a size of the CU, and the PU may be a square or rectangular block. For a CU of inter-frame predictive coding, there are 8 PU division manners shown in FIG. 2a to FIG. 2h. FIG. 2a to FIG. 2d show 4 symmetric division manners, which are respectively 2N×2N, 2N×N, N×2N, and N×N. FIG. 2e to FIG. 2h show 4 asymmetric division manners, which are respectively 2N×nU, 2N×nD, nL×2N, and nR×2N.

For the 2N×2N PU division manner for inter-frame prediction, if both a residual coefficient and a motion vector difference are zero, a coding mode of the CU is referred to as a skip mode. Different from a skip mode of the H.264/AVC, in the skip mode of the HEVC, a motion vector is acquired by using a motion merge technology (Merge), that is, for all motion information (including a motion vector, a reference frame index, and a reference frame list) of a current PU, a merge motion vector candidate list can be constructed according to motion information of adjacent PUs, and during coding, only a merge flag (Merge Flag) and an index (Merge Index) corresponding to an optimum merge motion vector need to be transmitted, and no other motion information needs to be transmitted. If a motion vector of a current PU is acquired by using the motion merge technology but includes a nonzero residual coefficient, a coding mode of the PU is referred to as a merge (Merge) mode.

For other cases of inter-frame prediction, the HEVC uses an adaptive motion vector prediction (AMVP) technology, that is, a prediction motion vector candidate list is constructed according to motion vector information of adjacent PUs, an optimum prediction motion vector is selected, then an optimum motion vector is selected through motion estimation, and a residual coefficient and complete motion information including a motion vector difference need to be transmitted during coding.

For a CU of intra-frame predictive coding, there are only two PU division manners: 2N×2N and N×N. The N×N division manner is only used for a CU whose depth is an allowed maximum depth.

A TU is a basic unit for transformation and quantizing. One CU may include one or more TUs. The TU also uses the quadtree recursive division structure. A size of the TU ranges from 4×4 to 32×32, and may be greater than that of the PU but does not exceed a size of the CU. FIG. 3 is a schematic diagram of a TU division manner of a CU.

During actual coding, mode selection needs to be performed for each CTU, to select optimum CU, PU, and TU division manners and a predictive coding type. Generally, according to the principle of rate-distortion optimization, for each CU division manner and PU division manner, overheads of intra-frame predictive coding performed in different TU division manners in at most 34 prediction directions need to be calculated; motion estimation is performed for each motion vector prediction manner to select the most matching predictive CU; then overheads of inter-frame predictive coding performed in different TU division manners are calculated; CU, PU, and TU division manners having a smallest cost are finally selected; and a corresponding predictive coding type is used as an optimum coding mode of a current CTU.

The HEVC standard uses the foregoing flexible CU, PU, and TU division manners and more intra-frame prediction directions and inter-frame motion vector prediction manners, which greatly improves prediction accuracy, thereby improving coding efficiency. However, because motion estimation for mode selection and coding overhead calculation involve a great number of highly complex calculation processes such as estimations of a sum of absolute differences (SAD), a sum of absolute transformed differences (SATD), a sum of squared errors (SSE), and a bit rate. Such flexible and diverse division manners and prediction manners of the HEVC greatly increase calculation complexity of a mode selection process. During current implementation of HEVC reference software, time consumed by calculation for mode selection takes up more than 90% of entire coding time. Such highly complex mode selection directly leads to great coding complexity of the HEVC, and therefore cannot satisfy an increasing number of applications of video coding with high requirements on real-time quality such as real-time video calling (especially video calling on a handheld device) and live media streaming. Moreover, offline video compression of a program source of a demanded video also requires a lot of server computing resources and coding time costs. Besides, coding efficiency of an inter-frame predictive frame is far greater than that of an intra-frame predictive frame. Therefore, during ordinary video coding, in order to ensure robustness of transmission and random access to a bitstream, one I frame is generally inserted every 1 to 2 seconds, that is, if a frame rate of a video is 15 fps, there is one I frame among each 15 to 30 frames and the other frames are inter-frame predictive frames. In applications such as high-definition video storage and streaming media, in order to ensure high compression efficiency, an interval between I frames is greater and may reach a maximum of 100 to 200 frames. Therefore, inter-frame predictive frames generally take up a great percentage in a video bitstream, and inter-frame mode selection is also a bottleneck during entire time consumed by video coding.

FIG. 4 is a flowchart of complete mode selection (where no quick mode selection algorithm is started) for coding a CU in the existing technology. As shown in FIG. 4, in this method, mode selection mainly includes the following steps S41 to S45:

S41: For a current CU, determine whether a depth (Depth) of the CU exceeds an allowed maximum depth; and if the depth exceeds the allowed maximum depth, stop this process; otherwise, continue to perform step S42.

S42: Sequentially calculate costs of coding performed according to merge 2N×2N, inter-frame 2N×2N, inter-frame N×N, inter-frame N×2N, inter-frame 2N×N, intra-frame 2N×2N, and intra-frame N×N modes; and when asymmetric PU division manners are allowed, further sequentially calculate costs of coding performed according to four modes: inter-frame 2N×nU, inter-frame 2N×nD, inter-frame nL×2N, and inter-frame nR×2N, where calculation for the inter-frame N×N and intra-frame N×N modes is performed only when the depth of the current CU is equal to the allowed maximum depth, and if an inter-frame flag_4×4_enabled_flag is 0, when a size of the CU is 8×8, a cost of the inter-frame N×N mode is not calculated either.

S43: Select a coding mode having a smallest cost among the modes calculated in step S42 as an optimum coding mode of the current CU, and record the smallest cost as an coding overhead of the current CU.

S44: Divide the current CU into 4 coding subunits having a depth Depth+1, and recursively invoke this process for each coding subunit.

S45: Add coding overheads of the 4 coding subunits having the depth Depth+1 (shown in FIG. 5), and compare a sum of the coding overheads with the coding overhead of the current CU; and if the coding overhead of the current CU is larger, an optimum coding mode of the current CU is a coding mode, which is optimum after the CU is divided into the coding subunits; otherwise, an optimum coding mode of the current CU is the coding mode, which is optimum before the CU is divided into the coding subunits.

In the foregoing mode selection method, for a mode selection process of each CTU, costs of coding performed according to each CU, PU, and TU division manner and intra-frame and inter-frame prediction manner need to be calculated, and a coding mode having a smallest cost is selected as an optimum coding mode of a current CTU. Although the optimum coding mode obtained by using the mode selection method is accurate, but calculation complexity is high. An ordinary offline video compression application cannot bear such a long time of compression and such a significant number of overheads of server computing resources, much less satisfy applications requiring real-time video coding such as video calling and live media streaming.

FIG. 6 is a flowchart of another mode selection method in the existing technology. As shown in FIG. 6, in this method, mode selection mainly includes the following steps S61 to S68:

S61: For a current CU, determine whether a depth (Depth) of the CU exceeds an allowed maximum depth; and if the depth exceeds the allowed maximum depth, stop this process; otherwise, continue to perform step S62.

S62: Sequentially calculate costs of coding performed according to inter-frame 2N×2N and merge 2N×2N modes.

S63: Determine whether both a residual coefficient and a motion vector difference when coding is performed according to a mode having a smallest cost among the inter-frame 2N×2N and merge 2N×2N modes are both zero; and if yes, predetermine that a coding mode of the current CU is a skip mode, and stop this process; otherwise, continue to perform step S64.

S64: Sequentially calculate costs of coding performed according to inter-frame N×N, inter-frame N×2N, inter-frame 2N×N, intra-frame 2N×2N, and intra-frame N×N modes; and when asymmetric PU division manners are allowed, further sequentially calculate costs of coding performed according to four modes: inter-frame 2N×nU, inter-frame 2N×nD, inter-frame nL×2N, and inter-frame nR×2N, where calculation for the inter-frame N×N and intra-frame N×N modes is performed only when the depth of the current CU is equal to the allowed maximum depth, and if an inter-frame flag_4×4_enabled_flag is 0, when a size of the CU is 8×8, a cost of the inter-frame N×N mode is not calculated either.

S65: Select a coding mode having a smallest cost among the modes calculated in step S64 as an optimum coding mode of the current CU.

S66: If the optimum coding mode of the current CU is the skip mode, stop this process; otherwise, continue to perform step S67.

S67: Divide the current CU into 4 coding subunits having a depth equal to Depth+1, and recursively invoke this process for each coding subunit.

S68: Add coding overheads of the 4 coding subunits having the depth Depth+1, and compare a sum of the coding overheads with the coding overhead of the current CU; and if the coding overhead of the current CU is larger, an optimum coding mode of the current CU is a coding mode, which is optimum after the CU is divided into the coding subunits; otherwise, an optimum coding mode of the current CU is the coding mode, which is optimum before the CU is divided into the coding subunits.

When the selection method described in step S61 to step S68 is compared with the selection method described in step S41 to step S45, the former provides a quick mode selection algorithm in which a CU division manner is decided in advance, where if an optimum coding mode of a current CU is a skip mode, the current CU is not further divided into coding subunits, and the mode selection process of the CU is stopped. The former also provides a quick mode selection algorithm in which the skip mode is detected in advance, where a mode having a smallest cost when coding is performed according to the inter-frame 2N×2N and merge 2N×2N modes is selected, and if both a residual coefficient and a motion vector difference of the mode are zero, it can be predetermined that an optimum coding mode of the current CU is the skip mode, and the mode selection process of the CU is stopped.

Such a quick mode selection method in which a skip mode is detected in advance and division of a CU in the skip mode into coding subunits is stopped in advance can reduce calculation complexity to some degree in a video scenario in which CUs in the skip mode take up a large percentage and a picture is relatively static. However, in an ordinary video scenario in which a picture moves to some degree, because calculation of a cost of coding performed according to the inter-frame 2N×2N mode involves highly complex processes of motion estimation and coding overhead calculation, the mode selection method still has high calculation complexity and falls far short of requirements on coding complexity of actual applications.

For the problem of high calculation complexity of mode selection for video coding in related technologies, no effective solution is provided yet currently.

SUMMARY

According to one aspect of embodiments of the present disclosure, an inter-frame mode selection method for video coding is provided.

The inter-frame mode selection method for video coding according to the embodiments of the present disclosure includes: S701: in case in which calculation of a coding overhead required for coding a coding unit $CU_{Depth}$ having a current depth Depth is to be skipped, invoking step S703 to step S705; and in a case in which the calculation of the coding overhead required for coding the coding unit $CU_{Depth}$ having the current depth Depth is not to be skipped, invoking step S702 to step S705; S702: determining a current optimum coding mode and coding overhead of the coding unit $CU_{Depth}$ in the current depth Depth; S703: dividing the coding unit $CU_{Depth}$ into multiple coding subunits having a depth Depth+1, and recursively performing step S701 to step S705 for each of the coding subunits until the depth of the coding subunit reaches a preset maximum depth or satisfies a division stopping condition, to determine an optimum coding mode and a coding overhead of each coding subunit; S704: comparing a sum of coding overheads of the multiple coding subunits with the current coding overhead of the coding unit $CU_{Depth}$; and S705: if the current coding overhead of the coding unit $CU_{Depth}$ is greater than the sum of the coding overheads of the multiple coding subunits, determining that an optimum coding mode of the coding unit $CU_{Depth}$ is a coding mode, which is optimum after the coding unit $CU_{Depth}$ is divided into the multiple coding subunits; otherwise, determining that the optimum coding mode of the coding unit $CU_{Depth}$ is the coding mode, which is optimum before the coding unit $CU_{Depth}$ is divided into the multiple coding subunits.

According to another aspect of the embodiments of the present disclosure, a video coding method is provided.

The video coding method according to the embodiments of the present disclosure includes: receiving to-be-coded video source data; determining a coding frame type of each frame in the video source data, to obtain an inter-frame predictive frame and an intra-frame predictive frame; determining a coding mode of the intra-frame predictive frame, and determining a coding mode of the inter-frame predictive frame by using a preset method, where the preset method is any one of the inter-frame mode selection methods provided in the foregoing content of the embodiments of the present disclosure; and coding the intra-frame predictive frame by using a first mode, and coding the inter-frame predictive frame by using a second mode, where the first mode is the determined coding mode of the intra-frame predictive frame, and the second mode is the coding mode, which is determined by using the preset method, of the inter-frame predictive frame.

According to another aspect of the embodiments of the present disclosure, an inter-frame mode selection apparatus for video coding is provided.

The inter-frame mode selection apparatus for video coding according to the embodiments of the present disclosure includes: an invoking unit, configured to: in a case in which calculation of a coding overhead required for coding a coding unit $CU_{Depth}$ having a current depth Depth is to be skipped, sequentially invoke a processing unit, a comparing unit, and a second determining unit, and in a case in which the calculation of the coding overhead required for coding the coding unit $CU_{Depth}$ having the current depth Depth is not to be skipped, sequentially invoke a first determining unit, the processing unit, the comparing unit, and the second determining unit; the first determining unit, configured to determine a current optimum coding mode and coding overhead of the coding unit $CU_{Depth}$ in the current depth Depth; the processing unit, configured to divide the coding unit $CU_{Depth}$ into multiple coding subunits having a depth Depth+1, and recursively invoke the invoking unit, the first determining unit, the processing unit, the comparing unit, and the second determining unit for each of the coding subunits until the depth of the coding subunit reaches a preset maximum depth or satisfies a division stopping condition, to determine an optimum coding mode and a coding overhead of each coding subunit; the comparing unit, configured to compare a sum of coding overheads of the multiple coding subunits with the current coding overhead of the coding unit $CU_{Depth}$; and the second determining unit, configured to: in a case in which it is determined through comparison that the current coding overhead of the coding unit $CU_{Depth}$ is greater than the sum of the coding overheads of the multiple coding subunits, determine that an optimum coding mode of the coding unit $CU_{Depth}$ is a coding mode, which is optimum after the coding unit $CU_{Depth}$ is divided into the multiple coding subunits; otherwise, determine that an optimum coding mode of the coding unit $CU_{Depth}$ is the coding mode, which is optimum before the coding unit $CU_{Depth}$ is divided into the multiple coding subunits.

BRIEF DESCRIPTION OF THE DRAWINGS

The accompanying drawings that constitute a part of this application are used to provide a further understanding of the present disclosure. Exemplary embodiments of the present disclosure and descriptions thereof are used for explaining the present disclosure, and do not constitute improper limitations on the present disclosure. The accompanying drawings are as follows:

Figure 5:
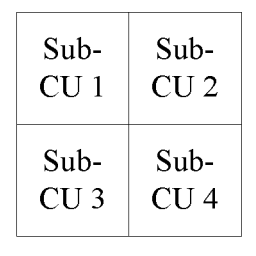

FIG. 5 is a schematic diagram of dividing a coding unit by using the mode selection method in FIG. 4;

DESCRIPTION OF EMBODIMENTS

Figure 1:
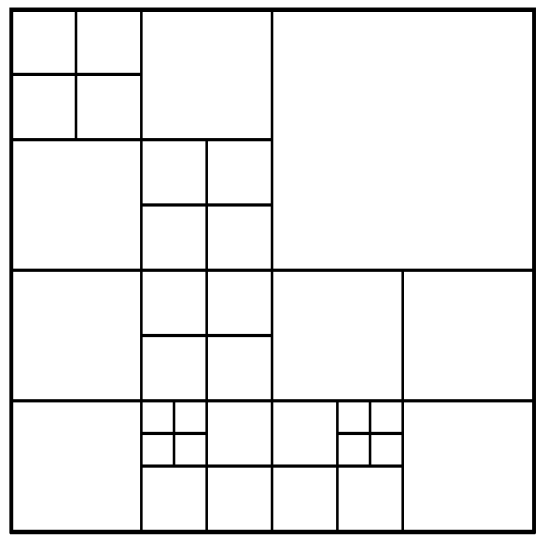
FIG. 1 shows an example of division of a structure of a coding tree unit according to a related technology.
Figure 2A:
FIG. 2a to FIG. 2h are schematic diagrams of division manners for predictive division of a coding unit according to a related technology.
Figure 2B:
Figure 2C:
Figure 2D:
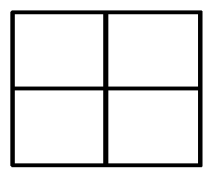
Figure 2E:
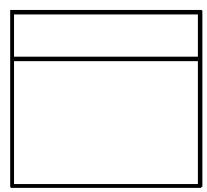
Figure 2F:
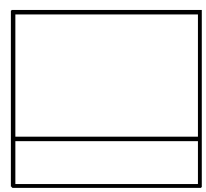
Figure 2G:
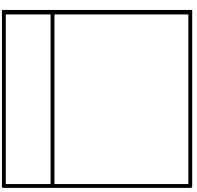
Figure 2H:
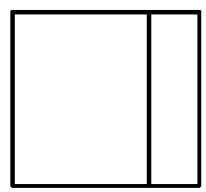
Figure 3:
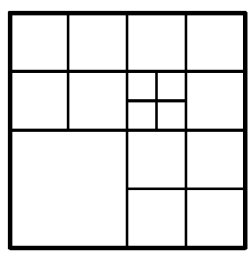
FIG. 3 is a schematic diagram of a division manner for transformative division of a coding unit according to a related technology.
Figure 4:
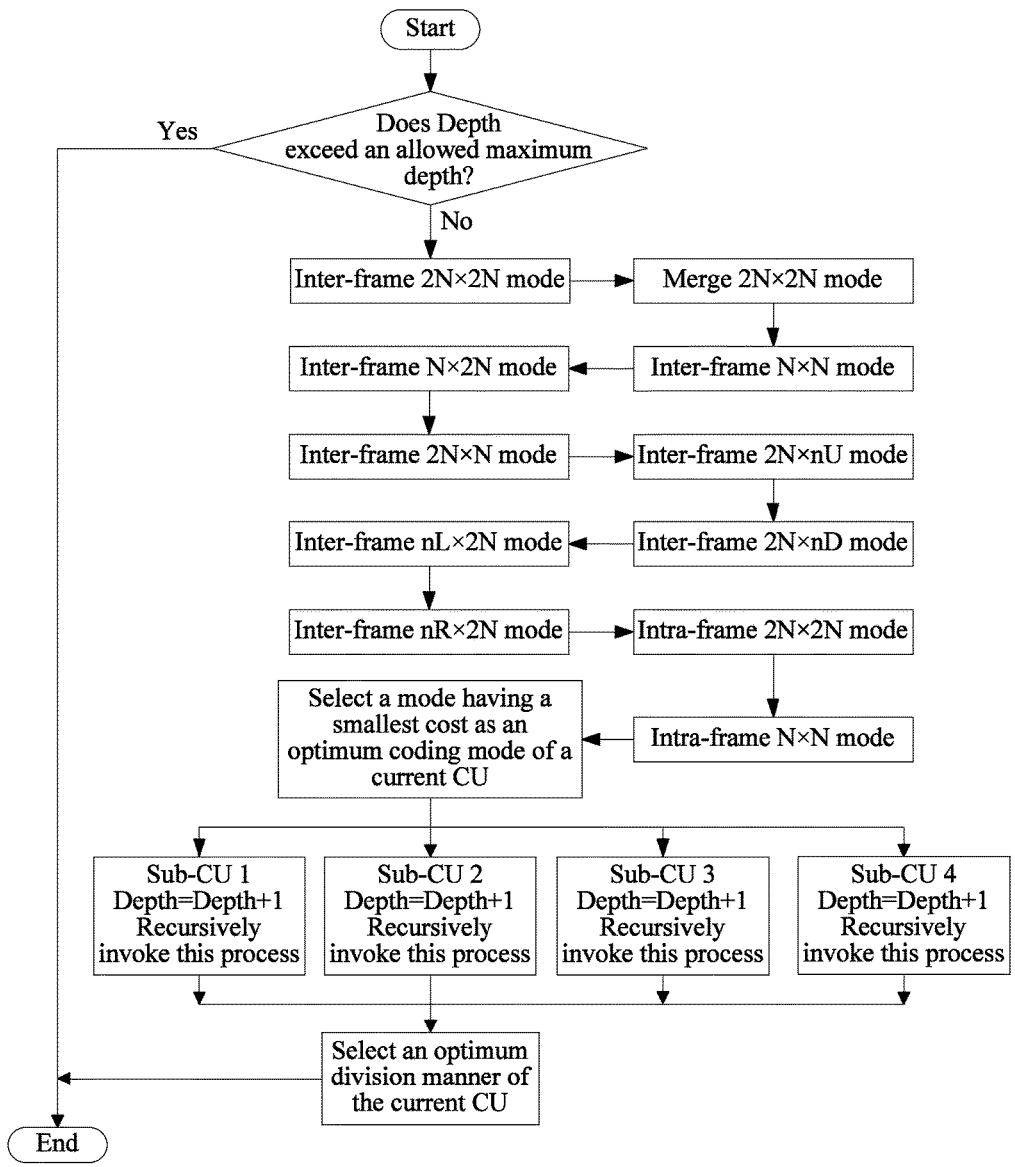
FIG. 4 is a flowchart of mode selection for a coding unit according to a related technology.
Figure 6:
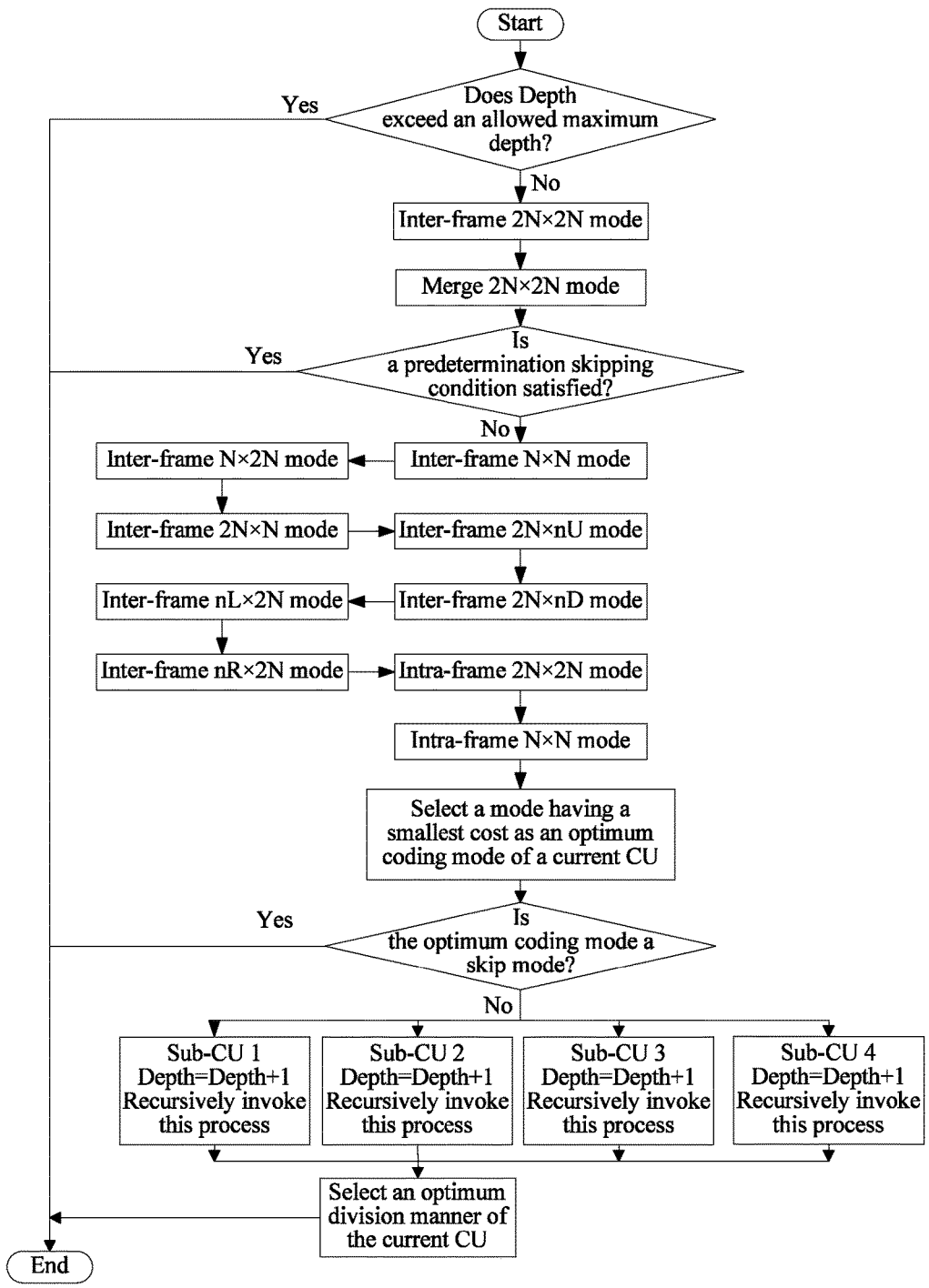
FIG. 6 is a flowchart of another type of mode selection for a coding unit according to a related technology.

To order that a person skilled in the art better understands solutions of the present disclosure, the following clearly and completely describes the technical solutions in embodiments of the present disclosure with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

It should be noted that the terms such as "first" and "second" in the specification and claims of the present disclosure and the foregoing accompanying drawings are used to differentiate similar objects, and are not used to describe a particular sequence or chronological order. It should be understood that data used in this way can be interchanged under appropriate circumstances, so that the embodiments described herein of the present disclosure can be implemented in another order except those shown in the drawings or descriptions. Moreover, the terms "include", "having", and any variants thereof are intended to cover a non-exclusive inclusion. For example, a process, method, system, product, or device including a series of steps or units is not necessarily limited to those steps or units clearly listed, but may include another step or unit that is not listed clearly or is inherent to this process, method, system, product, or device.

Embodiment 1

According to embodiments of the present disclosure, a method embodiment that can be used to implement an apparatus embodiment of this application may be provided. It should be noted that steps shown in a flowchart in an accompanying drawing may be performed, for example, in a computer system with a set of computer executable instructions, and although a logical order is shown in the flowchart, the shown or described steps may be performed in an order different from the order herein in some cases.

According to this embodiment of the present disclosure, an inter-frame mode selection method for video coding is provided. The following specifically introduces the inter-frame mode selection method for video coding provided by this embodiment of the present disclosure.

Figure 7:
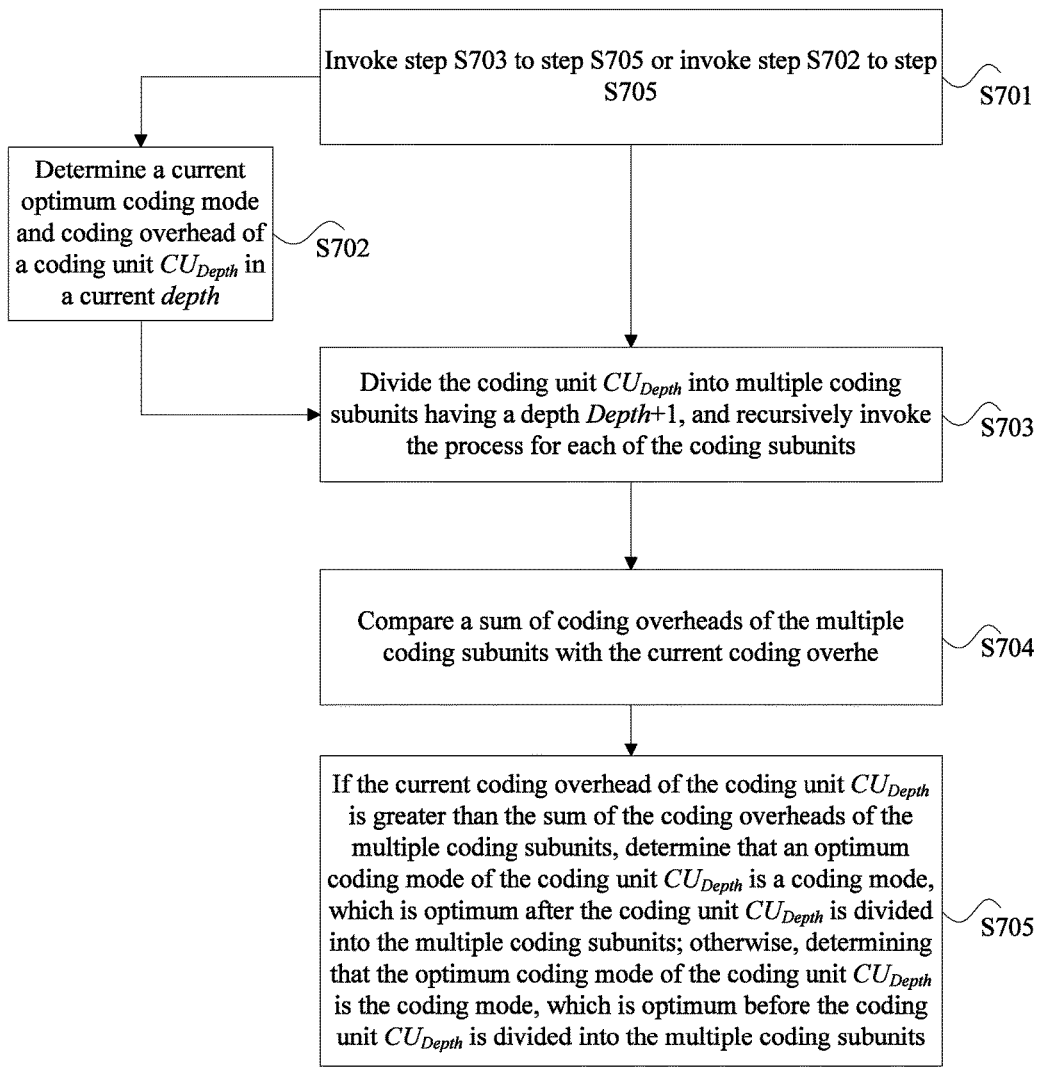
FIG. 7 is a flowchart of an inter-frame mode selection method for video coding according to an embodiment of the present disclosure.

FIG. 7 is a flowchart of an inter-frame mode selection method for video coding according to an embodiment of the present disclosure. As shown in FIG. 7, the method includes the following step 701 to step 705, where an initial value of a current depth Depth is 1.

S701: In a case in which calculation of a coding overhead required for coding a coding unit $CU_{Depth}$ having the current depth Depth is to be skipped, sequentially perform step S703 to step S705; and in a case in which the calculation of the coding overhead required for coding the coding unit $CU_{Depth}$ having the current depth Depth is not to be skipped, sequentially perform step S702 to step 705.

S702: Determine a current optimum coding mode and coding overhead of the coding unit $CU_{Depth}$ in the current depth Depth.

S703: Divide the coding unit $CU_{Depth}$ into multiple coding subunits having a depth Depth+1, and recursively perform step S701 to step S705 for each of the coding subunits until the depth of the coding subunit reaches a preset maximum depth or satisfies a division stopping condition, to determine an optimum coding mode and a coding overhead of each coding subunit. That is, if it is determined that the calculation of the coding overhead required for coding the coding unit $CU_{Depth}$ having the current depth Depth needs to be skipped, the coding unit having the current depth is further divided into coding subunits having a depth of the current depth plus 1, the new coding subunits obtained through division are used as target coding units, and the inter-frame mode selection method for video coding provided in this embodiment of the present disclosure is recursively invoked, where the current depth Depth is a variable, and each time the coding unit is divided, 1 is added to a depth value of the current depth.

S704: Compare a sum of coding overheads of the multiple coding subunits with the current coding overhead of the coding unit $CU_{Depth}$, where for the case in which the calculation of the coding overhead required for coding the coding unit $CU_{Depth}$ having the current depth Depth needs to be skipped, the coding overhead of the coding unit $CU_{Depth}$ is MAX, where MAX=$2^a-1$, and a is a bit number of a value type of the coding overhead, for example, if the value type of the coding overhead is a 32-bit unsigned integer, MAX=$2^{32}-1$.

S705: If the coding overhead of the coding unit $CU_{Depth}$ is greater than the sum of the coding overheads of the multiple coding subunits, determine that an optimum coding mode of the coding unit $CU_{Depth}$ is a current coding mode, which is optimum after the coding unit $CU_{Depth}$ is divided into the multiple coding subunits; otherwise, determine that an optimum coding mode of the coding unit $CU_{Depth}$ is the coding mode, which is optimum before the coding unit $CU_{Depth}$ is divided into the multiple coding subunits.

According to the inter-frame mode selection method for video coding provided in this embodiment of the present disclosure, by using relevance between a coding mode and a coding overhead in a time domain and a space domain, coding unit division manners are skipped or stopped in advance, thereby avoiding coding and cost calculation of various modes in these coding unit division manners. In this way, calculation complexity of a mode selection process is reduced effectively, a coding speed is increased, and a problem of high calculation complexity of mode selection for video coding in the existing technology is solved, thereby achieving effects of reducing complexity and increasing a coding speed.

Specifically, in this embodiment of the present disclosure, it is determined mainly through the following manner 1 whether the calculation of the coding overhead required for coding the coding unit $CU_{Depth}$ having the current depth Depth is to be skipped.

Manner 1

Figures 8A, 8B, 8C:
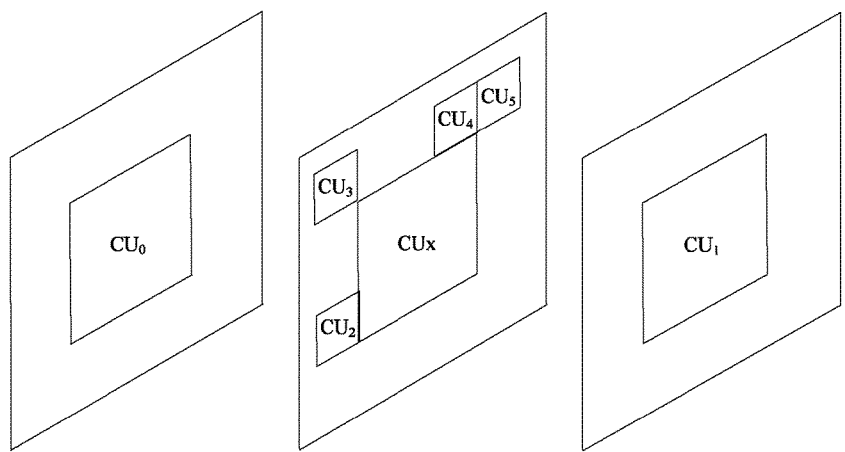
FIG. 8a to FIG. 8c are schematic diagrams of adjacent coding units CU' acquired by using the inter-frame mode selection method in FIG. 7.

First, coding units CU' that are coded before the coding unit $CU_{Depth}$ and are adjacent to the coding unit $CU_{Depth}$ in a time domain and/or a space domain and depths of the coding units CU' are acquired. Specifically, as shown in FIG. 8a to FIG. 8c, the coding units coded before the coding unit $CU_{Depth}$ generally include: two coding units adjacent to the coding unit $CU_{Depth}$ in the time domain, which are separately marked as a coding unit $CU'_0$ and a coding unit $CU'_1$, and four coding units adjacent to the coding unit $CU_{Depth}$ in the space domain and on the left, top left, top, and top right of the coding unit $CU_{Depth}$, which are respectively marked as a coding unit $CU'_2$, a coding unit $CU'_3$, a coding unit $CU'_4$, and a coding unit $CU'_5$.

Then it is determined whether $N_c$ first coding units exist among the coding units CU', where $N_c$ is a first preset parameter, and a depth of the first coding unit is greater than the current depth Depth, that is, it is determined whether $N_c$ coding units whose depths are greater than the current depth exist among the coding units CU'. In a case in which it is determined that $N_c$ first coding units exist among the coding units CU', it is determined that the calculation of the coding overhead required for coding the coding unit $CU_{Depth}$ is to be skipped.

Specifically, determining whether $N_c$ first coding units exist among the coding units CU' is mainly determining whether $C \geq N_c$ is valid, where $$C = \sum_i C_i,$$

$0 \leq i \leq 5$, that is, C is a sum of any $n_4$ ($1 \leq n_4 \leq 6$) elements in a set $[C_0, C_1, C_2, C_3, C_4, C_5]$, $$C_i = \begin{cases} 1, & Depth_i > Depth \\ 0, & Depth_i \leq Depth \text{ or } CU'_i \text{ does not exist} \end{cases},$$

$Depth_i$ is a depth of a coding unit $CU'_i$ among the coding units CU', and $N_c$ is the first preset parameter. That is, it is determined whether a quantity of coding units CU' whose depths are greater than a depth of a target coding unit among coding units CU' adjacent to the target coding unit CU in the time domain and/or the space domain reaches $N_c$. It is generally decided that $N_c=6$, $$C = \sum_{i=0}^{5} C_i,$$

and $n_4=6$. A value of $N_c$ may also be properly increased or reduced according to a requirement of an application on calculation complexity; in a case in which C includes many elements, $N_c$ is increased accordingly; otherwise, $N_c$ is reduced accordingly. In a case in which it is determined that $C \geq N_c$ is valid, it is determined that $N_c$ first coding units exist among the coding units CU'.

Figure 9:
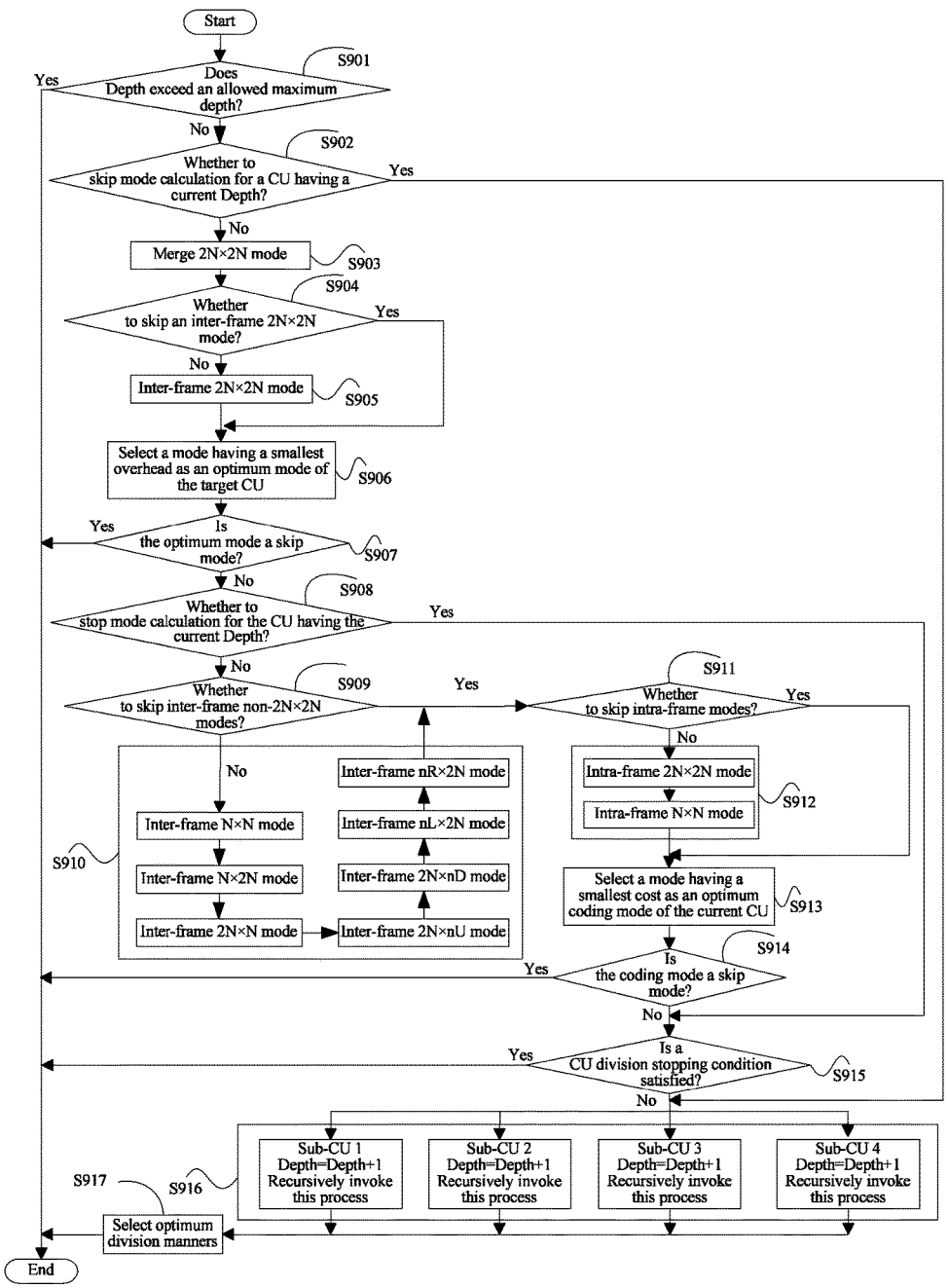
FIG. 9 is a flowchart of an inter-frame mode selection method for video coding according to a preferred embodiment of the present disclosure.

FIG. 9 is a specific flowchart of an inter-frame mode selection method for video coding according to an embodiment of the present disclosure. As shown in FIG. 9, the inter-frame mode selection method for video coding in this embodiment mainly includes step S901 to step S917:

S901: Before it is determined whether calculation of a coding overhead required for coding a coding unit $CU_{Depth}$ having a current depth Depth is to be skipped, use the coding unit having the current depth as a target coding unit CU, and determine whether the depth of the target coding unit CU exceeds an allowed maximum depth, which is specifically: acquire the depth of the target coding unit CU, and then compare the acquired depth with the allowed maximum depth; and if the acquired depth is less than the allowed maximum depth, determine that the depth of the target coding unit CU does not exceed the allowed maximum depth, and continue to perform step S902; otherwise, stop this process.

S902: Determine whether the calculation of the coding overhead required for coding the target coding unit $CU_{Depth}$ having the current depth (which is assumed to be Depth) is to be skipped (which is the same as step S701); and if it is determined that the calculation is to be skipped, determine that a smallest coding overhead of the target coding unit CU is MAX, and skip to S916; or if it is determined that the calculation is not to be skipped, perform step S903.

S903: Calculate a coding overhead of coding the target coding unit CU according to a merge 2N×2N mode.

S904: Determine whether calculation of a coding overhead of coding the target coding unit CU according to an inter-frame 2N×2N mode is to be skipped; and in a case in which it is determined that the calculation of the coding overhead of coding the target coding unit CU according to the inter-frame 2N×2N mode is to be skipped, skip to step S906; otherwise, perform step S905.

S905: Calculate the coding overhead of coding the target coding unit CU according to the inter-frame 2N×2N mode.

S906: Select a smallest coding overhead from the calculated coding overheads, and determine that a mode corresponding to the smallest coding overhead is used an optimum mode of the target coding unit CU.

S907: Determine whether the optimum mode is a skip mode, which is specifically: determine whether both a residual coefficient and a motion vector difference after the target coding unit CU is coded according to the mode corresponding to the smallest coding overhead are zero; and if both the residual coefficient and the motion vector difference are zero, determine that the optimum mode is the skip mode, and stop this process; otherwise, determine that the optimum mode is not the skip mode, and perform step S908, so as to further select an inter-frame mode for the target coding unit.

S908: Determine whether mode calculation for the target coding unit CU having the current depth is to be stopped; and if a determining result is yes, skip to step S915; otherwise, continue to perform S909.

S909: Determine whether calculation of coding overheads of coding the target coding unit CU according to inter-frame 2N×2N modes is to be skipped; and if a determining result is yes, skip to step S911; otherwise, continue to perform step S910.

S910: Calculate the coding overheads of coding the target coding unit CU according to the inter-frame 2N×2N modes, which is specifically: sequentially calculate costs of coding the target coding unit CU according to inter-frame N×N, inter-frame N×2N, and inter-frame 2N×N modes; and when asymmetric PU division manners are allowed, further sequentially calculate costs of coding performed according to four modes: inter-frame 2N×nU, inter-frame 2N×nD, inter-frame nL×2N, and inter-frame nR×2N, where calculation for the inter-frame N×N mode is performed only in a case in which the depth of the target coding unit CU is equal to the allowed maximum depth, and if an inter-frame flag_4x4_enabled_flag is 0, when a size of the target coding unit CU is 8×8, a cost of the inter-frame N×N mode is not calculated either.

S911: Determine whether calculation of coding overheads for coding the target coding unit CU according to intra-frame modes is to be skipped; and if a determining result is yes, skip to step S913; otherwise, continue to perform step S912.

S912: Calculate the coding overheads of coding the target coding unit CU according to the intra-frame modes, which is specifically: sequentially calculate costs of coding the target coding unit CU according to intra-frame 2N×2N and intra-frame N×N modes, where coding for the intra-frame N×N mode is performed only in a case in which the depth of the target coding unit CU is equal to the allowed maximum depth.

S913: Select a smallest coding overhead from the calculated coding overheads, and determine that a mode corresponding to the smallest coding overhead is used an optimum coding mode of the target coding unit CU.

S914: Determine whether the optimum coding mode is a skip mode, which is specifically: determine whether both a residual coefficient and a motion vector difference after the target coding unit CU is coded according to the mode corresponding to the smallest coding overhead are zero; and if both the residual coefficient and the motion vector difference are zero, determine that the optimum coding mode is the skip mode, and stop this process; otherwise, determine that the optimum coding mode is not the skip mode, and perform step S915, so as to further select an inter-frame mode for the target coding unit.

S915: Determine whether the target coding unit CU satisfies a division stopping condition; and if a determining result is yes, stop this process, determine that the optimum mode determined in step S913 is an optimum mode of the target coding unit CU, and code the target coding unit CU according to the current depth; otherwise, perform step S916.

S916: Divide the target coding unit CU into 4 coding units having a depth Depth+1, then use each coding unit having the depth Depth+1 as a target coding unit, recursively invoke the foregoing process, calculate a sum of coding overheads of the 4 coding units $CU_{Depth+1}$, and calculate optimum coding modes of the 4 coding units $CU_{Depth+1}$. That is, if it is determined that the calculation of the coding overhead required for coding the coding unit $CU_{Depth}$ is to be skipped, the coding unit $CU_{Depth}$ is divided into 4 coding subunits $CU_{Depth+1}$ having a depth Depth+1, it is determined that each coding subunit $CU_{Depth+1}$ is a target coding unit, the foregoing process is recursively invoked, a sum of coding overheads of the 4 coding units $CU_{Depth+1}$ is calculated, and optimum modes of the 4 coding units $CU_{Depth+1}$ are calculated, where after the coding unit is divided, 1 is added to the current depth, that is, Depth=Depth+1.

S917: Compare the smallest coding overhead determined in step S913 with the sum of the coding overheads of the 4 coding subunits; in a case in which it is determined through comparison that the smallest coding overhead is greater than the sum of the coding overheads, determine that an optimum mode of the target coding unit is a coding mode, which is optimum after the coding unit is divided into the multiple coding subunits; and in a case in which it is determined through comparison that the smallest coding overhead is less than the sum of the coding overheads, determine that an optimum mode of the target coding unit is the mode corresponding to the smallest coding overhead.

As can be seen from the foregoing description, in this preferred embodiment, an optimum coding mode of a target coding unit can be determined in the following manner, where the target coding unit is the coding unit $CU_{Depth}$ or the coding subunit: sequentially calculating coding overheads required for coding the target coding unit according to various coding modes; a coding overhead codes the target coding unit according to a current mode is calculated, determines whether calculation of the coding overhead or coding overheads required for coding the target coding unit according to the current mode or the current mode and modes after the current mode is to be skipped; in a case in which it is determined that the calculation of the coding overhead or coding overheads required for coding the target coding unit according to the current mode or the current mode and modes after the current mode is to be skipped, skipping the calculation of the coding overhead or coding overheads required for coding the target coding unit according to the current mode or the current mode and modes after the current mode, and selecting a smallest coding overhead from first coding overheads, where the first coding overheads are calculated coding overheads required for coding the target coding unit according to previous modes, and the previous modes are modes before the current mode; then determining whether target parameters when the target coding unit is coded by using a mode corresponding to the smallest coding overhead satisfy a preset condition, where the preset condition represents that it is predetermined that a coding mode of the target coding unit is a skip mode, that is, determining whether both a residual coefficient and a motion vector difference after the target coding unit CU is coded according to the mode corresponding to the smallest coding overhead are zero; and if both the residual coefficient and the motion vector difference are zero, predetermining that the optimum mode is the skip mode, that is, determining that the target parameters satisfy the preset condition; and in a case in which it is determined that the target parameters satisfies the preset condition, determining that the mode corresponding to the smallest coding overhead is a mode to be used for coding the target coding unit.

Coding modes used for coding a target coding unit mainly include: a merge 2N×2N mode (that is, a Merge 2N×2N mode), an inter-frame 2N×2N mode (that is, an Inter 2N×2N mode), inter-frame 2N×2N modes, and intra-frame modes.

Specifically, the inter-frame 2N×2N modes mainly include an inter-frame N×N mode (that is, an Inter N×N mode), an inter-frame N×2N mode (that is, an Inter N×2N mode), and an inter-frame 2N×N mode (that is, an Inter 2N×N mode). When asymmetric prediction unit PU division manners are allowed, the inter-frame 2N×2N modes further include an inter-frame nR×2N mode (that is, an Inter nR×2N mode), an inter-frame nL×2N mode (that is, an Inter nL×2N mode), an inter-frame 2N×nD mode (that is, an Inter 2N×nD mode), and an inter-frame 2N×nU mode (that is, an Inter 2N×nU mode). Calculating coding overheads of coding the target coding unit CU according to the inter-frame 2N×2N modes is sequentially calculating coding overheads of coding the target coding unit CU according to the inter-frame N×N mode, the inter-frame N×2N mode, and the inter-frame 2N×N mode, and in a case in which asymmetric prediction unit PU division manners are allowed, sequentially calculating coding overheads of coding the target coding unit CU according to the inter-frame nR×2N mode, the inter-frame nL×2N mode, inter-frame 2N×nD mode, inter-frame 2N×nU mode.

The intra-frame modes include an intra-frame 2N×2N mode (that is, an Intra 2N×2N mode) and an intra-frame N×N mode (that is, an Intra N×N mode). Calculating coding overheads of coding the target coding unit CU according to the intra-frame modes is sequentially calculating coding overheads of coding the target coding unit CU according to the intra-frame 2N×2N mode and the intra-frame N×N mode.

For an initial stage of calculation, after the coding overhead of coding the target coding unit CU according to the merge 2N×2N mode is calculated, it is determined whether the calculation of the coding overhead of coding the target coding unit CU according to the inter-frame 2N×2N mode is to be skipped. In the calculation process, after a coding overhead of coding the target coding unit CU according to an X mode is calculated, it is determined whether calculation of a coding overhead or coding overheads of coding the target coding unit CU according to one or more modes after the X mode is to be skipped. If after the coding overhead of coding the target coding unit CU according to the merge 2N×2N mode is calculated, it is determined that the calculation of the coding overhead of coding the target coding unit CU according to the inter-frame 2N×2N mode is to be skipped, a current smallest coding overhead is the overhead of coding the target coding unit CU according to the merge 2N×2N mode.

The following specifically describes a specific determining manner for determining whether the calculation of the coding overhead required for coding the target coding unit CU according to the current mode is to be skipped in this preferred embodiment of the present disclosure.

If a previous mode is the merge 2N×2N mode, and the current mode is the inter-frame 2N×2N mode, it may be determined by using the following manner 2 whether the calculation of the coding overhead required for coding the target coding unit CU according to the inter-frame 2N×2N mode is to be skipped. That is, step S904 may be specifically the following manner 2.

Manner 2

S201: Acquire the depth of the target coding unit CU, the coding overhead of coding the target coding unit CU according to the merge 2N×2N mode, a residual coefficient, and a motion vector difference, and acquire depths, coding modes, and coding overheads of coding units CU', where the coding units CU' are coding units that are coded before the coding unit $CU_{Depth}$ having the current depth Depth and are adjacent to the coding unit $CU_{Depth}$ in a time domain and/or a space domain.

S202: Determine, according to the depth, the residual coefficient, and the motion vector difference of the target coding unit CU and the depths, the coding modes, and the coding overheads of the coding units CU', whether the calculation of the coding overhead required for coding the target coding unit according to the current mode is to be skipped.

Specifically, the determining, according to the depth, the residual coefficient, and the motion vector difference of the target coding unit CU and the depths, the coding modes, and the coding overheads of the coding units CU', whether the calculation of the coding overhead required for coding the target coding unit according to the current mode is to be skipped mainly includes the following step S2021 to step S2024:

S2021: Calculate a value of a first variable according to the residual coefficient and the motion vector difference of the target coding unit CU, which is specifically: first determine whether both the residual coefficient and the motion vector difference are zero; and in a case in which it is determined that both the residual coefficient and the motion vector difference are zero, determine that the first variable bMergeDetectSkip=1, and determine that $Cost_{x,Merge}$=MAX; or in a case in which it is determined that both the residual coefficient and the motion vector difference are not zero, determine that the first variable bMergeDetectSkip=0, and determine that $Cost_{x,Merge}$ is the coding overhead of coding the coding unit $CU_{Depth}$ according to the merge 2N×2N mode, where MAX=$2^a$−1, and a is a bit number of a value type of $Cost_{x,Merge}$, for example, if the value type of $Cost_{x,Merge}$ is a 32-bit unsigned integer, MAX=$2^{32}$−1.

S2022: Calculate values of a second variable and a third variable according to the depth of the target coding unit CU and the depths, the coding modes, the coding overheads of the coding units CU', which is specifically: first determine whether it is predetermined that a coding mode of the target coding unit is the merge 2N×2N mode or an intra-frame mode; and in a case in which it is determined that it is predetermined that the coding mode of the target coding unit is the merge 2N×2N mode, determine that the second variable bFastDeciMerge=1; otherwise, determine that the second variable bFastDeciMerge=0; or in a case in which it is determined that it can be predetermined that the coding mode of the target coding unit is an intra-frame mode, determine that the third variable bFastDeciIntra=1; otherwise, determine that the third variable bFastDeciIntra=0.

S2023: Calculate a value of a fourth variable according to the coding overhead of coding the coding unit $CU_{Depth}$ according to the merge 2N×2N mode and the coding overheads of the coding units CU'.

S2024: Determine, according to the values of the first variable, the second variable, the third variable, and the fourth variable, whether the calculation of the coding overhead required for coding the target coding unit according to the inter-frame 2N×2N mode is to be skipped, which is specifically: determine whether a condition 1 and a condition 2 are valid, where the condition 1 is that bMergeDetectSkip=0 and bFastDeciMerge=0 and bFastDeciIntra=0, and the condition 2 is that bMergeDetectSkip=1 and bCheckFurther=1 and bFastDeciIntra=0; and in a case in which it is determined that the condition 1 or the condition 2 is valid, determine that the calculation of the coding overhead required for coding the target coding unit according to the inter-frame 2N×2N mode is to be skipped.

In the case in which it is determined that the condition 1 or the condition 2 is valid, it is determined that the calculation of the coding overhead required for coding the target coding unit CU according to the inter-frame 2N×2N mode is to be skipped. That is, as long as either of the condition 1 and the condition 2 is valid, it can be determined that the calculation of the coding overhead required for coding the target coding unit CU according to the inter-frame 2N×2N mode is to be skipped.

Further, the inter-frame mode selection method for video coding in this embodiment of the present disclosure further include: acquiring coding modes of the coding units CU', and the determining whether it is predetermined that a coding mode of the target coding unit is the merge 2N×2N mode or an intra-frame mode includes the following:

It is determined whether $M \geq N_m$ and $$Cost_{x,Merge} < \min_j(Cost''_j) \text{ and } \min_j(Cost''_j) \neq MAX$$

is valid; and in a case in which it is determined that $M \geq N_m$ and $$Cost_{x,Merge} < \min_j(Cost''_j) \text{ and } \min_j(Cost''_j) \neq MAX$$

is valid, it is determined that it is predetermined that the coding mode of the target coding unit is the merge 2N×2N mode, where $$M = \sum_i M_i,$$

$0 \leq i \leq 5$, that is, M is a sum of any $n_1$ ($1 \leq n_1 \leq 6$) elements in a set $[M_0, M_1, M_2, M_3, M_4, M_5]$. If a coding mode of a coding unit $CU'_i$ is the merge 2N×2N mode, $M_i=1$; if the coding mode of the coding unit $CU'_i$ is not the merge 2N×2N mode or the coding unit $CU'_i$ does not exist, $M_i=0$.

$$Cost''_j = \begin{cases} Cost_j \times 4^{(Depth_j - Depth)}, & CU'_j \text{ exists} \\ MAX, & CU'_j \text{ does not exist} \end{cases},$$

where $Depth_j$ is a depth of a coding unit $CU'_j$, $Cost_j$ is a coding overhead of the coding unit $CU'_j$, $j \in [0,1,2,3,4,5]$, and $N_m$ is a second preset parameter. The foregoing determining is determining whether a quantity of coding units CU' that are coded according to the merge 2N×2N mode among coding units CU' adjacent to the target coding unit CU in the time domain and/or the space domain reaches $N_m$. In order to balance coding efficiency and a coding speed, it may be generally decided that $$M = \sum_{i=2}^{5} M_i,$$

$n_1=4$, $N_m=4$, and $j=0$, 1, 2, or 4. A value of $N_m$ may also be properly increased or reduced according to a requirement of an application on calculation complexity; and in a case in which M includes many elements, $N_m$ is increased accordingly; otherwise, $N_m$ is reduced accordingly. Multiple values between 0 and 5 may be selected as a value of j to control calculation complexity.

It is determined whether $I \geq N_I$ is valid; and in a case in which it is determined that $I \geq N_I$ is valid, it is determined that the coding mode of the target coding unit is an intra-frame mode, where $$I = \sum_i I_i,$$

$0 \leq i \leq 5$, that is, I is a sum of any $n_2$ ($1 \leq n_2 \leq 6$) elements in a set $[I_0, I_1, I_2, I_3, I_4, I_5]$. If a coding mode of a coding unit $CU'_i$ is an intra-frame mode, $I_i=1$; if the coding mode of the coding unit $CU'_i$ is not an intra-frame mode or the coding unit $CU'_i$ does not exist, $I_i=0$. $N_I$ is a third preset parameter. That is, it is determined whether a quantity of coding units CU' that are coded according to an intra-frame mode among coding units CU' adjacent to the target coding unit CU in the time domain and/or the space domain reaches $N_I$. It is generally decided that $N_I=3$, $$I = \sum_{i=2}^{5} I_i,$$

and $n_2=4$. A value of $N_I$ may also be properly increased or reduced according to a requirement of an application on calculation complexity; and in a case in which I includes many elements, $N_I$ is increased accordingly; otherwise, $N_I$ is reduced accordingly.

The calculating a value of a fourth variable according to the coding overhead of coding the coding unit $CU_{Depth}$ according to the merge 2N×2N mode and the coding overheads of the coding units CU' includes the following:

It is determined whether $$Cost_{x,Merge} > T_1 \times \min_i(Cost''_{i,Merge})$$

is valid when $$\min_i(Cost''_{i,Merge}) \neq MAX \text{ and } \min_i(Cost''_{i,Merge}) \neq 0,$$

or it is determined whether $$Cost_{x,Merge} > T_2 \times \min_i(Cost''_i)$$

is valid when $$\min_i(Cost''_{i,Merge}) = MAX \text{ or } \min_i(Cost''_{i,Merge}) = 0.$$

$$Cost''_{i,Merge} = \begin{cases} 0, & CU'_i \text{ does not exist} \\ MAX, & Cost_{i,Merge} = MAX \\ Cost_{i,Merge} \times 4^{(Depth_i - Depth)}, & \text{or the like} \end{cases}$$

where $Cost_{i,Merge}$ is the coding overhead of coding the coding unit $CU'_i$ according to the merge 2N×2N mode, and $$Cost''_i = \begin{cases} Cost_i \times 4^{(Depth_i - Depth)}, & CU'_i \text{ exists} \\ MAX, & CU'_i \text{ does not exist} \end{cases},$$

where $Depth_i$ is a depth of the coding unit $CU'_i$, and $Cost_i$ is a coding overhead of the coding unit $CU'_i$. $i \in [0,1,2,3,4,5]$, T1 and T2 are both preset multiples, and T1≠T2. It may be generally decided that T1=1, T2=1.2, and i=2, 3, 4, or 5. Multiple values between 0 and 5 may be selected as a value of i to control calculation complexity, where higher complexity corresponds to a larger value of T, and lower complexity corresponds to a smaller value of T. In a case in which it is determined that $$Cost_{x,Merge} > \min_i(Cost''_{i,Merge})$$

is valid when $$\min_i(Cost''_{i,Merge}) \neq MAX \text{ and } \min_i(Cost''_{i,Merge}) \neq 0,$$

it is determined that the fourth variable bCheckFurther=1; otherwise, it is determined that the fourth variable bCheckFurther=0; or in a case in which it is determined that $$Cost_{x,Merge} > T_2 \times \min_i(Cost''_i)$$

is valid when $$\min_i(Cost''_{i,Merge}) = MAX \text{ or } \min_i(Cost''_{i,Merge}) = 0,$$

it is determined that the fourth variable bCheckFurther=1; otherwise, it is determined that the fourth variable bCheckFurther=0.

If a previous mode is the merge 2N×2N mode or the inter-frame 2N×2N mode, it may be determined by using the following manner 3 whether the calculation of coding overheads of coding the target coding unit CU according to inter-frame 2N×2N modes is to be skipped. That is, step S909 may be specifically the following manner 3.

Manner 3

First, coding modes of coding units CU' that are coded before the target coding unit and are adjacent to the target coding unit in a time domain and/or a space domain are acquired.

Then a value of a third variable is calculated according to the coding modes of CU's. Specifically, it is determined whether it is predetermined that a target mode is an intra-frame mode, and in a case in which it is determined that the target mode is an intra-frame mode, it is determined that the third variable bFastDeciIntra=1; otherwise, it is determined that the third variable bFastDeciIntra=0. A specific determining manner for determining whether it is predetermined that the target mode is an intra-frame mode is the same as that in the foregoing, and is not described in detail herein.

Then it is determined according to the value of the third variable whether the calculation of the coding overhead required for coding the target coding unit according to the current mode is to be skipped. Specifically, it is determined whether bFastDeciIntra=1 is valid, and in a case in which it is determined that bFastDeciIntra=1 is valid, it is determined that the calculation of the coding overhead required for coding the target coding unit according to the current mode is to be skipped.

Further, the foregoing manner 3 may be further divided into the following step S301 to step S304:

S301: Acquire coding units CU' that are coded before the target coding unit and are adjacent to the target coding unit in a time domain and/or a space domain and depths of the coding units CU'. Specifically, the coding units coded before the target coding unit CU generally include: two coding units adjacent to the target coding unit CU in the time domain, which are separately marked as a coding unit $CU'_0$ and a coding unit $CU'_1$, and four coding units adjacent to the target coding unit CU in the space domain and on the left, top left, top, and top right of the target coding unit CU, which are respectively marked as a coding unit $CU'_2$, a coding unit $CU'_3$, a coding unit $CU'_4$, and a coding unit $CU'_5$.

S302: Determine whether $I \geq N_I$ is valid, where $$I = \sum_i I_i,$$

$0 \leq i \leq 5$, that is, I is a sum of any $n_2$ ($1 \leq n_2 \leq 6$) elements in a set $[I_0, I_1, I_2, I_3, I_4, I_5]$. If a coding mode of a coding unit $CU'_i$ is an intra-frame mode, $I_i=1$; if the coding mode of the coding unit $CU'_i$ is not an intra-frame mode or the coding unit $CU'_i$ does not exist, $I_i=0$. $N_I$ is a third preset parameter. It is generally decided that $N_I=3$, $$I = \sum_{i=2}^{5} I_i,$$

and $n_2=4$. A value of $N_I$ may also be properly increased or reduced according to a requirement of an application on calculation complexity; and in a case in which I includes many elements, $N_I$ is increased accordingly; otherwise, $N_I$ is reduced accordingly.

S303: In a case in which it is determined that $I \geq N_I$ is valid, record that bFastDeciIntra=1; or in a case in which it is determined that $I \geq N_I$ is not valid, record that bFastDeciIntra=0.

S304: Determine whether bFastDeciIntra=1 is valid.

In a case in which it is determined that bFastDeciIntra=1 is valid, it is determined that the calculation of the coding overheads of coding the target coding unit according to the inter-frame 2N×2N modes is to be skipped.

Further, it may also be determined whether a smallest coding overhead after calculation is performed for the target coding unit CU according to the merge 2N×2N mode or the inter-frame 2N×2N mode is less than a threshold T8; and if it is determined that the smallest coding overhead after calculation is performed for the target coding unit CU according to the merge 2N×2N mode or the inter-frame 2N×2N mode is less than the threshold T8, it is determined that the calculation of the coding overheads of coding the target coding unit according to the inter-frame 2N×2N modes is to be skipped.

If a previous mode is the merge 2N×2N mode or an inter-frame 2N×2N mode or an inter-frame 2N×2N mode, it may be determined by using the following manner 4 whether the calculation of coding overheads of coding the target coding unit CU according to intra-frame modes is to be skipped. That is, step S911 may be specifically the following manner 4.

Manner 4

S401: Acquire coding units CU' that are coded before the target coding unit and are adjacent to the target coding unit in a time domain and/or a space domain and depths of the coding units CU'. Specifically, the coding units coded before the target coding unit CU generally include: two coding units adjacent to the target coding unit CU in the time domain, which are separately marked as a coding unit $CU'_0$ and a coding unit $CU'_1$, and four coding units adjacent to the target coding unit CU in the space domain and on the left, top left, top, and top right of the target coding unit CU, which are respectively marked as a coding unit $CU'_2$, a coding unit $CU'_3$, a coding unit $CU'_4$, and a coding unit $CU'_5$.

S402: Determine whether an intra-frame mode exists among the acquired coding modes of the coding units CU'.

In a case in which it is determined that no intra-frame mode exists among the coding modes of the acquired coding units CU', it is determined that the calculation of the coding overheads of coding the target coding unit according to the intra-frame modes is to be skipped.

Further, it may also be determined whether a smallest coding overhead after calculation is performed for the target coding unit CU according to the merge 2N×2N mode, the inter-frame 2N×2N mode, and the inter-frame 2N×2N modes is less than a threshold T10; and if it is determined that the smallest coding overhead after calculation is performed for the target coding unit CU according to the merge 2N×2N mode, the inter-frame 2N×2N mode, and the inter-frame 2N×2N modes is less than the threshold T10, it is determined that the calculation of the coding overheads of coding the target coding unit according to the intra-frame modes is to be skipped.

Further, in step S915, it is mainly determined through the following manner 5 whether the target coding unit CU satisfies the division stopping condition.

Manner 5

S501: Acquire the depth of the target coding unit and the coding overhead for coding the target coding unit according to the merge 2N×2N mode.

S502: Acquire coding units CU' that are coded before the target coding unit and are adjacent to the target coding unit in a time domain and/or a space domain, coding overheads of the coding units CU', coding modes of the coding units CU', and depths of the coding units CU'. Specifically, the coding units coded before the target coding unit CU generally include: two coding units adjacent to the target coding unit CU in the time domain, which are separately marked as a coding unit $CU'_0$ and a coding unit $CU'_1$, and four coding units adjacent to the target coding unit CU in the space domain and on the left, top left, top, and top right of the target coding unit CU, which are respectively marked as a coding unit $CU'_2$, a coding unit $CU'_3$, a coding unit $CU'_4$, and a coding unit $CU'_5$.

S503: Determine whether $S \geq N_s$ and $$Cost_{x,Merge} < \min_j(Cost''_{j,Merge}) \text{ and } \min_j(Cost''_{j,Merge}) \neq MAX$$

is valid, where $Cost_{x,Merge}$ is the coding overhead of coding the target coding unit according to the merge 2N×2N mode, $MAX=2^a-1$, and a is a bit number of a value type of $Cost_{x,Merge}$ for example, if the value type of $Cost_{x,Merge}$ is a 32-bit unsigned integer, $MAX=2^{32}-1$.

$$S = \sum_i S_i,$$

$0 \leq i \leq 5$, that is, S is a sum of any $n_3$ ($1 \leq n_3 \leq 6$) elements in a set $[S_0, S_1, S_2, S_3, S_4, S_5]$;

$$S_i = \begin{cases} 1, & Depth_i \leq Depth \\ 0, & Depth_i > Depth \text{ or } CU'_i \end{cases}$$

does not exist;

$$Cost''_{j,Merge} = \begin{cases} 0, & CU'_j \text{ does not exist} \\ MAX, & Cost_{j,Merge} = MAX \\ Cost_{j,Merge} \times 4^{|Depth_j - Depth|}, & \text{or the like} \end{cases}$$

where Depth is the depth of the target coding unit, $Depth_i$ is a depth of a coding unit $CU'_i$, $Cost_{j,Merge}$ is a coding overhead of coding a coding unit $CU'_j$ according to the merge 2N×2N mode; $j \in [0,1,2,3,4,5]$; and $N_s$ is a fourth preset parameter. It is generally decided that Ns=4, $$S = \sum_{i=2}^{5} S_i,$$

$n_3=4$, and $j=0, 1, 2, 3, 4$, or 5. A value of $N_s$ may be properly increased or reduced according to a requirement of an application on calculation complexity; and in a case in which S includes many elements, $N_s$ is increased accordingly; otherwise, $N_s$ is reduced accordingly.

S505: In a case in which it is determined that $S \geq N_s$ and $$Cost_{x,Merge} < \min_j(Cost''_{j,Merge}) \text{ and } \min_j(Cost''_{j,Merge}) \neq MAX$$

is not valid, divide the target coding unit to obtain multiple target coding subunits; otherwise, stop dividing the target coding unit CU.

In step S908, it is mainly determined whether bMergeDetectSkip=1 or bFastDeciMerge=1 is valid, so as to determine whether the mode calculation for the target coding unit CU having the current depth is to be stopped; and in a case in which it is determined that bMergeDetectSkip=1 or bFastDeciMerge=1 is valid, step S915 is performed; or in a case in which it is determined that bMergeDetectSkip=1 or bFastDeciMerge=1 is valid, step S909 is performed.

Further, it may also be determined whether the smallest cost determined in step S906 is less than a threshold T7, so as to determine whether the mode calculation for the target coding unit CU having the current depth is to be stopped; and if it is determined that the smallest cost determined in step S906 is less than the threshold T7, step S915 is performed; otherwise, step S909 is performed. In this embodiment of the present disclosure, T8>T7.

According to the inter-frame mode selection method for video coding provided in this preferred embodiment of the present disclosure, before a target coding unit is coded according to a current mode, it is first determined whether calculation of a coding overhead required for coding the target coding unit according to the current mode is to be skipped; in a case in which it is determined that the calculation is to be skipped, a smallest coding overhead is selected from calculated coding overheads; it is preliminarily determined that a mode corresponding to the coding overhead is a current optimum coding mode of the target coding unit; it is further determined whether target parameters when the target coding unit is coded according to the mode corresponding to the smallest coding overhead satisfy a preset condition; and if the preset condition is satisfied, it is determined that an optimum coding mode of the target coding unit is the mode corresponding to the smallest coding overhead. In this way, not only coding and cost calculation of a coding unit division manner are skipped or stopped in advance, but coding and cost calculation of a small-probability coding mode are also skipped or stopped in advance, thereby further reducing calculation complexity of a mode selection process and increasing a coding speed. Experiments on HEVC reference software show that when the inter-frame mode selection method provided in this embodiment of the present disclosure is used for an HEVC standard test sequence, a coding speed can be increased by about 50% on average, and a coding efficiency loss is controlled within 1%.

Embodiment 2

This embodiment of the present disclosure further provides a video coding method. The following specifically introduces the video coding method provided in this embodiment of the present disclosure.

Figure 10:
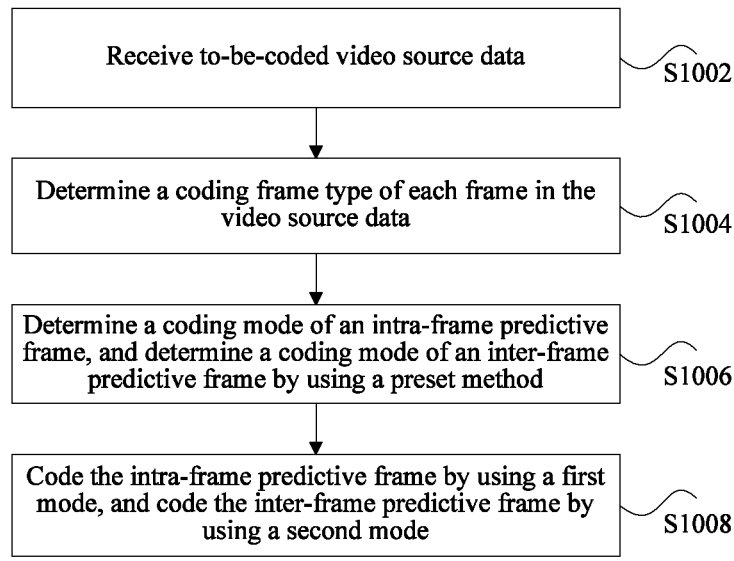
FIG. 10 is a flowchart of a video coding method according to an embodiment of the present disclosure.

FIG. 10 is a flowchart of a video coding method according to an embodiment of the present disclosure. As shown in FIG. 10, the video coding method mainly includes the following step S1002 to step S1008:

S1002: Receive to-be-coded video source data.

S1004: Determine a coding frame type of each frame in the video source data, that is, distinguish between an inter-frame predictive frame and an intra-frame predictive frame.

S1006: Determine a coding mode of the intra-frame predictive frame, and determine a coding mode of the inter-frame predictive frame by using a preset method, where the preset method is any one of the inter-frame mode selection methods provided in the foregoing content of the embodiments of the present disclosure.

S1008: Code the intra-frame predictive frame by using a first mode, and code the inter-frame predictive frame by using a second mode, where the first mode is the determined coding mode of the intra-frame predictive frame, and the second mode is the coding mode, which is determined by using the preset method, of the inter-frame predictive frame.

By using the inter-frame mode selection method provided in the foregoing content of the embodiments of the present disclosure, the video coding method provided in this embodiment of the present disclosure effectively reduces calculation complexity of calculation for mode selection in a video coding process, thereby achieving an effect of improving a coding speed.

It needs to be noted that the foregoing method embodiments are described as a series of action combinations for ease of description, but a person skilled in the art should know that the present disclosure is not limited to the described order of the actions because some steps may be performed in another order or simultaneously according to the present disclosure. Besides, a person skilled in the art should also know that the embodiments described in this specification are all preferred embodiments, and a related action and module may not be essential to the present disclosure.

Through the foregoing description of the implementation manners, a person skilled in the art may clearly understand that the method in the foregoing embodiments may be implemented by using software plus a necessary universal hardware platform, and certainly may also be implemented by using hardware, but the former is a preferred implementation manner in most cases. Based on such an understanding, the technical solutions of the present disclosure essentially, or the part contributing to the existing technology, may be embodied in the form of a software product. The computer software product is stored in a computer readable storage medium (such as a ROM/RAM, a magnetic disk, or an optical disc), and includes several instructions for instructing a terminal device (which may be a mobile phone, a computer, a server, or a network device) to execute the method described in the embodiments of the present disclosure.

Embodiment 3

According to this embodiment of the present disclosure, an inter-frame mode selection apparatus for video coding used to implement the foregoing inter-frame mode selection method for video coding is further provided. The inter-frame mode selection apparatus is mainly used to execute the inter-frame mode selection method provided in the foregoing content of the embodiments of the present disclosure.

The following specifically introduces the inter-frame mode selection apparatus for video coding provide in this embodiment of the present disclosure.

Figure 11:
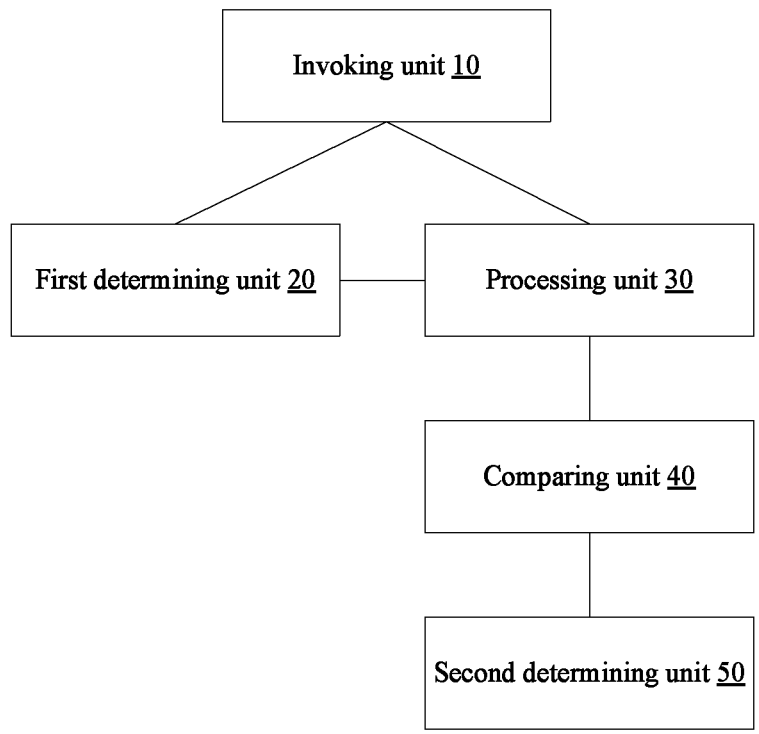
FIG. 11 is a schematic diagram of an inter-frame mode selection apparatus for video coding according to an embodiment of the present disclosure.

FIG. 11 is a schematic diagram of an inter-frame mode selection apparatus for video coding according to an embodiment of the present disclosure. As shown in FIG. 11, the inter-frame mode selection apparatus for video coding provide in this embodiment of the present disclosure mainly includes an invoking unit 10, a first determining unit 20, a processing unit 30, a comparing unit 40, and a second determining unit 50, where an initial value of a current depth Depth is 1.

The invoking unit 10 is configured to: in a case in which calculation of a coding overhead required for coding a coding unit Depth having the current depth $CU_{Depth}$ is to be skipped, sequentially invoke the processing unit 30, the comparing unit 40, and the second determining unit 50, and in a case in which the calculation of the coding overhead required for coding the coding unit Depth having the current depth $CU_{Depth}$ is not to be skipped, sequentially invoke the first determining unit 20, the processing unit 30, the comparing unit 40, and the second determining unit 50.

The first determining unit 20 is configured to determine a current optimum coding mode and coding overhead of the coding unit Depth in the current depth $CU_{Depth}$.

This processing unit 30 is configured to divide the coding unit $CU_{Depth}$ into multiple coding subunits having a depth Depth+1, and recursively invoke the invoking unit 10, the first determining unit 20, the processing unit 30, the comparing unit 40, and the second determining unit 50 for each of the coding subunits until the depth of the coding subunit reaches a preset maximum depth or satisfies a division stopping condition, to determine an optimum coding mode and a coding overhead of each coding subunit. That is, if it is determined that the calculation of the coding overhead required for coding the coding unit $CU_{Depth}$ having the current depth Depth needs to be skipped, the coding unit having the current depth is further divided into coding subunits having a depth of the current depth plus 1, the new coding subunits obtained through division are used as target coding units, and the inter-frame mode selection method for video coding provided in the embodiments of the present disclosure is recursively invoked, where the current depth $CU_{Depth}$ is a variable, and each time the coding unit is divided, 1 is added to a depth value of the current depth.

The comparing unit 40 is configured to compare a sum of coding overheads of the multiple coding subunits with the current coding overhead of the coding unit $CU_{Depth}$, where for the case in which the calculation of the coding overhead required for coding the coding unit $CU_{Depth}$ having the current depth $CU_{Depth}$ needs to be skipped, the coding overhead of the coding unit $CU_{Depth}$ is equal to MAX, where MAX=$2^a$−1, and a is a bit number of a value type of the coding overhead, for example, if the value type of the coding overhead is a 32-bit unsigned integer, MAX=$2^{32}$−1.

The second determining unit 50 is configured to: in a case in which it is determined through comparison that the current coding overhead of the coding unit $CU_{Depth}$ is greater than the sum of the coding overheads of the multiple coding subunits, determine that an optimum coding mode of the coding unit $CU_{Depth}$ is a coding mode, which is optimum after the coding unit $CU_{Depth}$ is divided into the multiple coding subunits; otherwise, determine that an optimum coding mode of the coding unit $CU_{Depth}$ is the coding mode, which is optimum before the coding unit $CU_{Depth}$ is divided into the multiple coding subunits.

According to the inter-frame mode selection apparatus for video coding provided in this embodiment of the present disclosure, by using relevance between a coding mode and a coding overhead in a time domain and a space domain, coding unit division manners are skipped or stopped in advance, thereby avoiding coding and cost calculation of various modes in these coding unit division manners. In this way, calculation complexity of a mode selection process is reduced effectively, a coding speed is increased, and a problem of high calculation complexity of mode selection for video coding in the existing technology is solved, thereby achieving effects of reducing complexity and increasing a coding speed.

Specifically, in this embodiment of the present disclosure, the inter-frame mode selection apparatus further includes an acquiring unit and a judging unit, where the acquiring unit is configured to acquire coding units CU' that are coded before the coding unit $CU_{Depth}$ and are adjacent to the coding unit $CU_{Depth}$ in a time domain and/or a space domain and depths of the coding units CU', where specifically, the coding units coded before the coding unit $CU_{Depth}$ generally include: two coding units adjacent to the coding unit $CU_{Depth}$ in the time domain, which are separately marked as a coding unit $C'_0$ and a coding unit $CU'_1$, and four coding units adjacent to the coding unit $CU_{Depth}$ in the space domain and on the left, top left, top, and top right of the coding unit $CU_{Depth}$, which are respectively marked as a coding unit $CU'_2$, a coding unit $CU'_3$, a coding unit $CU'_4$, and a coding unit $CU'_5$; and the judging unit is configured to determine whether $N_c$ first coding units exist among the coding units CU', where $N_c$ is a first preset parameter, and a depth of the first coding unit is greater than the current depth Depth, that is, determine whether $N_c$ coding units whose depths are greater than the current depth exist among the coding units CU'; and in a case in which it is determined that CU' first coding units exist among the coding units $N_c$, determine that the calculation of the coding overhead required for coding the coding unit $CU_{Depth}$ is to be skipped.

Specifically, the judging unit is mainly configured to determine whether $C \geq N_c$ is valid, when $$C = \sum_i C_i,$$

$0 \leq i \leq 5$, that is, C is a sum of any $n_4$ ($1 \leq n_4 \leq 6$) elements in a set $[C_0, C_1, C_2, C_3, C_4, C_5]$, $$C_i = \begin{cases} 1, & Depth_i > Depth \\ 0, & Depth_i \leq Depth \text{ or } CU'_i \end{cases}$$

does not exist, $Depth_i$ is a depth of a coding unit $CU'_i$ among the coding units CU', and $N_c$ is the first preset parameter. That is, it is determined whether a quantity of coding units CU' whose depths are greater than a depth of a target coding unit among coding units CU' adjacent to the target coding unit CU in the time domain and/or the space domain reaches $N_c$. It is generally decided that $N_c$=6, $$C = \sum_{i=0}^{5} C_i,$$

and $n_4=6$. A value of $N_c$ may be also properly increased or reduced according to a requirement of an application on calculation complexity; and in a case in which C includes many elements, $N_c$ is increased accordingly, otherwise, $N_c$ is reduced accordingly. In a case in which it is determined that $C \geq N_c$ is valid, it is determined that $N_c$ first coding units exist among the coding units CU'.

Preferably, in this embodiment of the present disclosure, an optimum coding mode of a target coding unit is determined by using the following modules, that is, both the first determining unit 20 and the processing unit 30 may include the following modules: a first judging module, a processing module, a second judging module, and a determining module, where the target coding unit is the coding unit $CU_{Depth}$ or the coding subunit.

The first judging module is configured to determine whether calculation of a coding overhead or coding overheads required for coding the target coding unit according to a current mode or the current mode and modes after the current mode is to be skipped.

Coding modes used for coding a target coding unit mainly include: a merge 2N×2N mode (that is, a Merge 2N×2N mode), an inter-frame 2N×2N mode (that is, an Inter 2N×2N mode), inter-frame 2N×2N modes, and intra-frame modes.

Specifically, the inter-frame 2N×2N modes mainly include an inter-frame N×N mode (that is, an Inter N×N mode), an inter-frame N×2N mode (that is, an Inter N×2N mode), and an inter-frame 2N×N mode (that is, an Inter 2N×N mode). When asymmetric prediction unit PU division manners are allowed, the inter-frame 2N×2N modes further include an inter-frame nR×2N mode (that is, an Inter nR×2N mode), an inter-frame nL×2N mode (that is, an Inter nL×2N mode), an inter-frame 2N×nD mode (that is, an Inter 2N×nD mode), and an inter-frame 2N×nU mode (that is, an Inter 2N×nU mode). Calculating coding overheads of coding the target coding unit CU according to the inter-frame 2N×2N modes is sequentially calculating coding overheads of coding the target coding unit CU according to the inter-frame N×N mode, the inter-frame N×2N mode, and the inter-frame 2N×N mode, and in a case in which asymmetric prediction unit PU division manners are allowed, sequentially calculating coding overheads of coding the target coding unit CU according to the inter-frame nR×2N mode, the inter-frame nL×2N mode, inter-frame 2N×nD mode, inter-frame 2N×nU mode.

The intra-frame modes include an intra-frame 2N×2N mode (that is, an Intra 2N×2N mode) and an intra-frame N×N mode (that is, an Intra N×N mode). Calculating coding overheads of coding the target coding unit CU according to the intra-frame modes is sequentially calculating coding overheads of coding the target coding unit CU according to the intra-frame 2N×2N mode and the intra-frame N×N mode.

For an initial stage of calculation, after the coding overhead of coding the target coding unit CU according to the merge 2N×2N mode is calculated, it is determined whether the calculation of the coding overhead of coding the target coding unit CU according to the inter-frame 2N×2N mode is to be skipped. In the calculation process, after a coding overhead of coding the target coding unit CU according to an X mode is calculated, it is determined whether calculation of a coding overhead or coding overheads of coding the target coding unit CU according to one or more modes after the X mode is to be skipped.

This processing module is configured to: in a case in which the first judging module determines that the calculation of the coding overhead required for coding the target coding unit according to the current mode is to be skipped, skip the calculation of the coding overhead required for coding the target coding unit according to the current mode, and select a smallest coding overhead from first coding overheads, where the first coding overheads are calculated coding overheads required for coding the target coding unit according to previous modes, and the previous modes are modes before the current mode, where if after a coding overhead of coding the target coding unit CU according to the merge 2N×2N mode is calculated, it is determined that calculation of a coding overhead of coding the target coding unit CU according to the inter-frame 2N×2N mode is to be skipped, the current smallest coding overhead is the overhead of coding the target coding unit CU according to the merge 2N×2N mode.

The second judging module is configured to determine whether target parameters when the target coding unit is coded by using a mode corresponding to the smallest coding overhead satisfy a preset condition, where the preset condition represents that it is predetermined that a coding mode of the target coding unit is a skip mode. Specifically, it is mainly determined whether the mode corresponding to the smallest coding overhead is a skip mode (that is, a Skip mode), and it may be determined whether both a residual coefficient and a motion vector difference after the target coding unit CU is coded according to the mode corresponding to the smallest coding overhead are zero, and in a case in which both of the two are zero, it can be determined that the mode corresponding to the smallest coding overhead is the skip mode.

The determining module is configured to: in a case in which it is determined that the target parameters do not satisfy the preset condition, determine that the mode corresponding to the smallest coding overhead is a mode to be used for coding the target coding unit.

The following specifically describes a specific determining manner used by the first judging module to execute the determining process in this preferred embodiment of the present disclosure.

If a previous mode is the merge 2N×2N mode, and the current mode is the inter-frame 2N×2N mode, the second judging module mainly executes modules for the following manners, so as to determine whether the calculation of the coding overhead required for coding the target coding unit CU according to the inter-frame 2N×2N mode is to be skipped.

First, the depth of the target coding unit CU, the coding overhead of coding the target coding unit CU according to the merge 2N×2N mode, a residual coefficient, and a motion vector difference are acquired, and depths, coding modes, and coding overheads of coding units CU' are acquired, where the coding units CU' are coding units that are coded before the coding unit $CU_{Depth}$ having the current depth Depth and are adjacent to the coding unit $CU_{Depth}$ in a time domain and/or a space domain.

Then it is determined, according to the depth, the residual coefficient, and the motion vector difference of the target coding unit CU and the depths, the coding modes, and the coding overheads of the coding units CU', whether the calculation of the coding overhead required for coding the target coding unit according to the current mode is to be skipped. The determining, according to the depth, the residual coefficient, and the motion vector difference of the target coding unit CU and the depths, the coding modes, and the coding overheads of the coding units CU', whether the calculation of the coding overhead required for coding the target coding unit according to the current mode is to be skipped mainly includes the following step 1.1 to step 1.4:

1.1: Calculate a value of a first variable according to the residual coefficient and the motion vector difference of the target coding unit CU, which is specifically: first determine whether both the residual coefficient and the motion vector difference are zero; and in a case in which it is determined that both the residual coefficient and the motion vector difference are zero, determine that the first variable bMergeDetectSkip=1, and determine that $Cost_{x,Merge}$=MAX; or in a case in which it is determined that both the residual coefficient and the motion vector difference are not zero, determine that the first variable bMergeDetectSkip=0, and determine that $Cost_{x,Merge}$ is the coding overhead of coding the coding unit $CU_{Depth}$ according to the merge 2N×2N mode, where MAX=$2^a$−1, and a is a bit number of a value type of $Cost_{x,Merge}$, for example, if the value type of $Cost_{x,Merge}$ is a 32-bit unsigned integer, MAX=$2^{32}$−1.

1.2: Calculate values of a second variable and a third variable according to the depth of the target coding unit CU and the depths, the coding modes, the coding overheads of the coding units CU', which is specifically: first determine whether it is predetermined that a coding mode of the target coding unit is the merge 2N×2N mode or an intra-frame mode; and in a case in which it is determined that it is predetermined that the coding mode of the target coding unit is the merge 2N×2N mode, determine that the second variable bFastDeciMerge=1; otherwise, determine that the second variable bFastDeciMerge=0; or in a case in which it is determined that it can be predetermined that the coding mode of the target coding unit is an intra-frame mode, determine that the third variable bFastDeciIntra=1; otherwise, determine that the third variable bFastDeciIntra=0.

1.3: Calculate a value of a fourth variable according to the coding overhead of coding the coding unit $CU_{Depth}$ according to the merge 2N×2N mode and the coding overheads of the coding units CU'.

1.4: Determine, according to the values of the first variable, the second variable, the third variable, and the fourth variable, whether the calculation of the coding overhead required for coding the target coding unit according to the inter-frame 2N×2N mode is to be skipped, which is specifically: determine whether a condition 1 and a condition 2 are valid, where the condition 1 is that bMergeDetectSkip=0, bFastDeciMerge=0, and bFastDeciIntra=0, and the condition 2 is that bMergeDetectSkip=1, bCheckFurther=1, and bFastDeciIntra=0; and in a case in which it is determined that the condition 1 or the condition 2 is valid, determine that the calculation of the coding overhead required for coding the target coding unit according to the inter-frame 2N×2N mode is to be skipped.

In the case in which it is determined that the condition 1 or the condition 2 is valid, it is determined that the calculation of the coding overhead required for coding the target coding unit CU according to the inter-frame 2N×2N mode is to be skipped. That is, as long as either of the condition 1 and the condition 2 is valid, it can be determined that the calculation of the coding overhead required for coding the target coding unit CU according to the inter-frame 2N×2N mode is to be skipped.

The determining whether a target mode is the merge 2N×2N mode or an intra-frame mode includes: determining whether M≥$N_m$ and $$Cost_{x,Merge} < \min_j(Cost''_j) \text{ and } \min_j(Cost''_j) \neq MAX$$

is valid; and in a case in which it is determined that M≥$N_m$ and $$Cost_{x,Merge} < \min_j(Cost''_j) \text{ and } \min_j(Cost''_j) \neq MAX$$

is valid, determining that it is predetermined that the coding mode of the target coding unit is the merge 2N×2N mode, where $$M = \sum_i M_i,$$

0≤i≤5, that is, M is a sum of any [$M_0,M_1,M_2,M_3,M_4,M_5$] ($n_1$) elements in a set 1≤$n_1$≤6. If a coding mode of a coding unit $CU'_i$ is the merge 2N×2N mode, $M_i$=1; if the coding mode of the coding unit $CU'_i$ is not the merge 2N×2N mode or the coding unit $CU'_i$ does not exist, $M_i$=0.

$$Cost''_j = \begin{cases} Cost_j \times 4^{(Depth_j - Depth)}, & CU'_j \text{ exists} \\ MAX, & CU'_j \text{ does not exist} \end{cases},$$

where $Depth_j$ is a depth of a coding unit $CU'_j$, $Cost_j$ is a coding overhead of the coding unit $CU'_j$, j∈[0,1,2,3,4,5], and $N_m$ is a second preset parameter. The foregoing determining is determining whether a quantity of coding units CU' that are coded according to the merge 2N×2N mode among coding units CU' adjacent to the target coding unit CU in the time domain and/or the space domain reaches $N_m$. In order to balance coding efficiency and a coding speed, it may be generally decided that $$M = \sum_{i=2}^{5} M_i,$$

$n_1$=4, $N_m$=4, and j=0, 1, 2, or 4. A value of $N_m$ may also be properly increased or reduced according to a requirement of an application on calculation complexity; and in a case in which M includes many elements, $N_m$ is increased accordingly; otherwise, $N_m$ is reduced accordingly. Multiple values between 0 and 5 may be selected as a value of j to control calculation complexity.

It is determined whether I≥$N_I$ is valid; and in a case in which it is determined that I≥$N_I$ is valid, determining that the coding mode of the target coding unit is an intra-frame mode, where $$I = \sum_i I_i,$$

0≤i≤5, that is, I is a sum of any [$I_0,I_1,I_2,I_3,I_4,I_5$] ($n_2$) elements in a set 1≤$n_2$≤6. If a coding mode of a coding unit $CU'_i$ is an intra-frame mode, $I_i$=1; if the coding mode of the coding unit $CU'_i$ is not an intra-frame mode or the coding unit $CU'_i$ does not exist, $I_i$=0. $N_I$ is a third preset parameter. That is, it is determined whether a quantity of coding units CU' that are coded according to an intra-frame mode among coding units CU' adjacent to the target coding unit CU in the time domain and/or the space domain reaches $N_I$. It is generally decided that $N_I=3$, $$I = \sum_{i=2}^{5} I_i,$$

and $n_2=4$. A value of $N_I$ may also be properly increased or reduced according to a requirement of an application on calculation complexity; and in a case in which I includes many elements, $N_I$ is increased accordingly; otherwise, $I \geq N_I$ is reduced accordingly.

The calculating a value of a fourth variable according to the coding overhead of coding the coding unit $CU_{Depth}$ according to the merge 2N×2N mode and the coding overheads of the coding units CU' includes the following:

It is determined whether $$\min_i(Cost''_{i,Merge}) \neq \text{MAX and } \min_i(Cost''_{i,Merge}) \neq 0$$

is valid when $$Cost_{x,Merge} > T_1 \times \min_i(Cost''_{i,Merge}),$$

or it is determined whether $$\min_i(Cost''_{i,Merge}) = \text{MAX or } \min_i(Cost''_{i,Merge}) = 0$$

is valid when $$Cost_{x,Merge} > T_2 \times \min_i(Cost''_i).$$

$$Cost''_{i,Merge} = \begin{cases} 0, & CU'_i \text{ does not exist} \\ \text{MAX}, & Cost_{i,Merge} = \text{MAX} \\ Cost_{i,Merge} \times 4^{|Depth_i - Depth|}, & \text{or the like} \end{cases},$$

where $Cost_{i,Merge}$ is the coding overhead of coding the coding unit $CU'_i$ according to the merge 2N×2N mode, and $$Cost''_i = \begin{cases} Cost_i \times 4^{(Depth_i - Depth)}, & CU'_i \text{ exists} \\ \text{MAX}, & CU'_i \text{ does not exist} \end{cases},$$

where $Depth_i$ is a depth of the coding unit $CU'_i$, and $Cost_i$ is a coding overhead of the coding unit $CU'_i$. $i \in [0,1,2,3,4,5]$, T1 and T2 are both preset multiples, and T1≠T2. It may be generally decided that T1=1, T2=1.2, and i=2, 3, 4, or 5. Multiple values between 0 and 5 may be selected as a value of i to control calculation complexity, where higher complexity corresponds to a larger value of T, and lower complexity corresponds to a smaller value of T. In a case in which it is determined that $$\min_i(Cost''_{i,Merge}) \neq \text{MAX and } \min_i(Cost''_{i,Merge}) \neq 0$$

is valid when $$Cost_{x,Merge} > \min_i(Cost''_{i,Merge}),$$

it is determined that the fourth variable bCheckFurther=1; otherwise, it is determined that the fourth variable bCheckFurther=0; or in a case in which it is determined that $$\min_i(Cost''_{i,Merge}) = \text{MAX or } \min_i(Cost''_{i,Merge}) = 0$$

is valid when $$Cost_{x,Merge} > T_2 \times \min_i(Cost''_i),$$

it is determined that the fourth variable bCheckFurther=1; otherwise, it is determined that the fourth variable bCheckFurther=0.

If a previous mode is the merge 2N×2N mode or the inter-frame 2N×2N mode, the second judging module mainly executes modules for the following manners, so as to determine whether the calculation of the coding overheads required for coding the target coding unit CU according to the inter-frame 2N×2N modes is to be skipped.

First, coding modes of coding units CU' that are coded before the target coding unit and are adjacent to the target coding unit in a time domain and/or a space domain are acquired.

Then a value of a third variable is calculated according to the coding modes of CU's. Specifically, it is determined whether it is predetermined that a target mode is an intra-frame mode, and in a case in which it is determined that the target mode is an intra-frame mode, it is determined that the third variable bFastDeciIntra=1; otherwise, it is determined that the third variable bFastDeciIntra=0. A specific determining manner for determining whether it is predetermined that the target mode is an intra-frame mode is the same as that in the foregoing, and is not described in detail herein.

Then it is determined according to the value of the third variable whether the calculation of the coding overhead required for coding the target coding unit according to the current mode is to be skipped. Specifically, it is determined whether bFastDeciIntra=1 is valid, and in a case in which it is determined that bFastDeciIntra=1 is valid, it is determined that the calculation of the coding overhead required for coding the target coding unit according to the current mode is to be skipped.

Further, the foregoing step may be further divided into the following step 2.1 to step 2.4:

2.1: Acquire coding units CU' that are coded before the target coding unit and are adjacent to the target coding unit in a time domain and/or a space domain and depths of the coding units CU'. Specifically, the coding units coded before the target coding unit CU generally include: two coding units adjacent to the target coding unit CU in the time domain, which are separately marked as a coding unit $CU'_0$ and a coding unit $CU'_1$, and four coding units adjacent to the target coding unit CU in the space domain and on the left, top left, top, and top right of the target coding unit CU, which are respectively marked as a coding unit CU'$_2$, a coding unit CU'$_3$, a coding unit CU'$_4$, and a coding unit CU'$_5$.

2.2: Determine whether I≥N$_I$ is valid, where $$I = \sum_i I_i, 0 \le i \le 5,$$

that is, I is a sum of any [I$_0$,I$_1$,I$_2$,I$_3$,I$_4$,I$_5$] (n$_2$) elements in a set 1≤n$_2$≤6. If a coding mode of a coding unit CU'$_i$ is an intra-frame mode, I$_i$=1; if the coding mode of the coding unit CU'$_i$ is not an intra-frame mode or the coding unit CU'$_i$ does not exist, I$_i$=0. N$_I$ is a third preset parameter. It is generally decided that N$_I$=3, $$I = \sum_{i=2}^{5} I_i,$$

and n$_2$=4. A value of N$_I$ may also be properly increased or reduced according to a requirement of an application on calculation complexity; and in a case in which I includes many elements, N$_I$ is increased accordingly; otherwise, I≥N$_I$ is reduced accordingly.

2.3: In a case in which it is determined that I≥N$_I$ is valid, record that bFastDeciIntra=1; or in a case in which it is determined that I≥N$_I$ is not valid, record that bFastDeciIntra=0.

2.4: Determine whether bFastDeciIntra=1 is valid.

In a case in which it is determined that bFastDeciIntra=1 is valid, it is determined that the calculation of the coding overheads of coding the target coding unit according to the inter-frame 2N×2N modes is to be skipped.

Further, it may also be determined whether a smallest coding overhead after calculation is performed for the target coding unit CU according to the merge 2N×2N mode or the inter-frame 2N×2N mode is less than a threshold T8; and if it is determined that the smallest coding overhead after calculation is performed for the target coding unit CU according to the merge 2N×2N mode or the inter-frame 2N×2N mode is less than the threshold T8, it is determined that the calculation of the coding overheads of coding the target coding unit according to the inter-frame 2N×2N modes is to be skipped.

If a previous mode is the merge 2N×2N mode or an inter-frame 2N×2N mode or an inter-frame 2N×2N mode, the second judging module mainly executes modules for the following manners, so as to determine whether the calculation of the coding overheads required for coding the target coding unit CU according to the intra-frame modes is to be skipped.

First, acquire coding units CU' that are coded before the target coding unit and are adjacent to the target coding unit in a time domain and/or a space domain and depths of the coding units CU'. Specifically, the coding units coded before the target coding unit CU generally include: two coding units adjacent to the target coding unit CU in the time domain, which are separately marked as a coding unit CU'$_0$ and a coding unit CU'$_1$, and four coding units adjacent to the target coding unit CU in the space domain and on the left, top left, top, and top right of the target coding unit CU, which are respectively marked as a coding unit CU'$_2$, a coding unit CU'$_3$, a coding unit CU'$_4$, and a coding unit CU'$_5$.

Second, determine whether an intra-frame mode exists among the acquired coding modes of the coding units CU'.

In a case in which it is determined that no intra-frame mode exists among the coding modes of the acquired coding units CU', it is determined that the calculation of the coding overheads of coding the target coding unit according to the intra-frame modes is to be skipped.

Further, it may also be determined whether a smallest coding overhead after calculation is performed for the target coding unit CU according to the merge 2N×2N mode, the inter-frame 2N×2N mode, and the inter-frame 2N×2N modes is less than a threshold T10; and if it is determined that the smallest coding overhead after calculation is performed for the target coding unit CU according to the merge 2N×2N mode, the inter-frame 2N×2N mode, and the inter-frame 2N×2N modes is less than the threshold T10, it is determined that the calculation of the coding overheads of coding the target coding unit according to the intra-frame modes is to be skipped.

Further, the inter-frame mode selection apparatus for video coding provided by this embodiment of the present disclosure further includes a unit executing the following manners, so as to determine whether the target coding unit CU satisfies the division stopping condition.

First, the depth of the target coding unit and the coding overhead for coding the target coding unit according to the merge 2N×2N mode are acquired.

Second, coding units CU' that are coded before the target coding unit and are adjacent to the target coding unit in a time domain and/or a space domain, coding overheads of the coding units CU', coding modes of the coding units CU', and depths of the coding units CU' are acquired. Specifically, the coding units coded before the target coding unit CU generally include: two coding units adjacent to the target coding unit CU in the time domain, which are separately marked as a coding unit CU'$_0$ and a coding unit CU'$_1$, and four coding units adjacent to the target coding unit CU in the space domain and on the left, top left, top, and top right of the target coding unit CU, which are respectively marked as a coding unit CU'$_2$, a coding unit CU'$_3$, a coding unit CU'$_4$, and a coding unit CU'$_5$.

Then, it is determined whether $$S \ge N_s \text{ and } Cost_{x,Merge} < \min_j(Cost''_{j,Merge}) \text{ and } \min_j(Cost''_{j,Merge}) \ne \text{MAX}$$

is valid, where Cost$_{x,Merge}$ is the coding overhead of coding the target coding unit according to the merge 2N×2N mode, MAX=$2^a$−1, and a is a bit number of a value type of Cost$_{x,Merge}$, for example, if the value type of Cost$_{x,Merge}$ is a 32-bit unsigned integer, MAX=$2^{32}$−1.

$$S = \sum_i S_i,$$

0≤i≤5, that is, S is a sum of any [S$_0$,S$_1$,S$_2$,S$_3$,S$_4$,S$_5$] (n$_3$) elements in a set 1≤n$_3$≤6;

$$S_i = \begin{cases} 1, Depth_i \le Depth \\ 0, Depth_i > Depth \text{ or } CU'_i \text{ does not exist} \end{cases};$$

-continued $$Cost''_{j,Merge} = \begin{cases} 0, & CU'_j \text{ does not exist} \\ MAX, & Cost_{j,Merge} = MAX \\ Cost_{j,Merge} \times 4^{|Depth_j - Depth|}, \text{ or the like} \end{cases}$$

where Depth is the depth of the target coding unit, $Depth_j$ is a depth of a coding unit $CU'_j$, $Depth_j$ is a coding overhead of coding a coding unit $CU'_j$ according to the merge 2N×2N mode; $Cost_{j,Merge}$; and $N_s$ is a fourth preset parameter. It is generally decided that Ns=4, $CU'_j$, j∈[0,1,2,3,4,5]=4, and j=0, 1, 2, 3, 4, or 5. A value of $N_s$ may be properly increased or reduced according to a requirement of an application on calculation complexity; and in a case in which S includes many elements, $N_s$ is increased accordingly; otherwise, $N_s$ is reduced accordingly. In a case in which it is determined that $$S \geq N_s \text{ and } Cost_{x,Merge} < \min_j(Cost''_{j,Merge}) \text{ and } \min_j(Cost''_{j,Merge}) \neq MAX$$

is not valid, the target coding unit is divided; otherwise, the division of the target coding unit CU is stopped.

Correspondingly, by determining whether bMergeDetectSkip=1 or bFastDeciMerge=1 is valid, it is determined whether mode calculation for the target coding unit CU having the current depth is to be stopped; and in a case in which it is determined that bMergeDetectSkip=1 or bFastDeciMerge=1 is valid, it is determined whether division is to be stopped; or in a case in which it is determined that bMergeDetectSkip=1 or bFastDeciMerge=1 is not valid, it is determined whether the calculation of coding overheads required for coding the target coding unit according to the inter-frame 2N×2N modes is to be skipped.

According to the inter-frame mode selection apparatus for video coding provided in this preferred embodiment of the present disclosure, before a target coding unit is coded according to a current mode, it is first determined whether calculation of a coding overhead required for coding the target coding unit according to the current mode is to be skipped; in a case in which it is determined that the calculation is to be skipped, a smallest coding overhead is selected from calculated coding overheads; it is preliminarily determined that a mode corresponding to the coding overhead is a current optimum coding mode of the target coding unit; it is further determined whether target parameters when the target coding unit is coded according to the mode corresponding to the smallest coding overhead satisfy a preset condition; and if the preset condition is satisfied, it is determined that an optimum coding mode of the target coding unit is the mode corresponding to the smallest coding overhead. In this way, not only coding and cost calculation according to a coding unit division manner are skipped or stopped in advance, but coding and cost calculation according to a small-probability coding mode are also skipped or stopped in advance, thereby further reducing calculation complexity of a mode selection process and increasing a coding speed. Experiments on HEVC reference software show that when the inter-frame mode selection method provided in this embodiment of the present disclosure is used for an HEVC standard test sequence, a coding speed can be increased by about 50% on average, and a coding efficiency loss is controlled within 1%.

Embodiment 4

This embodiment of the present disclosure further provides a video coding apparatus. The video coding apparatus is mainly used to execute the video coding method provided in the foregoing content of the embodiment of the present disclosure. The following specifically introduces the video coding apparatus provided in this embodiment of the present disclosure.

Figure 12:
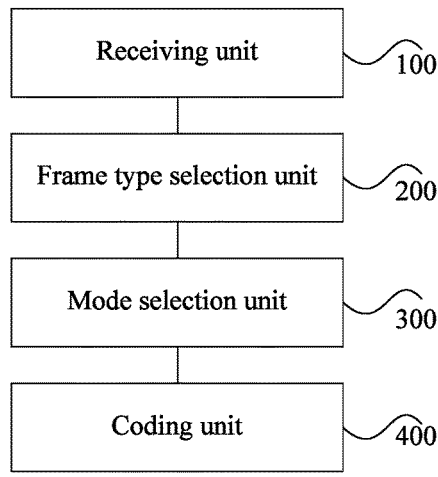
FIG. 12 is a schematic diagram of a video coding apparatus according to an embodiment of the present disclosure.

FIG. 12 is a schematic diagram of a video coding apparatus according to an embodiment of the present disclosure. As shown in FIG. 12, the video coding apparatus mainly includes a receiving unit 100, a frame type selection unit 200, a mode selection unit 300, and a coding unit 400, where the receiving unit 100 is configured to receive to-be-coded video source data;

the frame type selection unit 200 is configured to determine a coding frame type of each frame in the video source data, that is, distinguish between an inter-frame predictive frame and an intra-frame predictive frame;

the mode selection unit 300 is configured to determine a coding mode of the intra-frame predictive frame, and determine a coding mode of the inter-frame predictive frame by using a preset method, where the preset method is any one of the inter-frame mode selection methods provided in the foregoing content of the embodiments of the present disclosure; and the coding unit 400 is configured to code the intra-frame predictive frame by using a first mode, and code the inter-frame predictive frame by using a second mode, where the first mode is the determined coding mode of the intra-frame predictive frame, and the second mode is the coding mode, which is determined by using the preset method, of the inter-frame predictive frame.

By using the inter-frame mode selection method provided in the foregoing content of the embodiments of the present disclosure, the video coding apparatus provided in this embodiment of the present disclosure effectively reduces calculation complexity of calculation for mode selection in a video coding process, thereby achieving an effect of improving a coding speed.

Embodiment 5

This embodiment of the present disclosure further provides a video coding device. The following specifically introduces the video coding device provided in this embodiment of the present disclosure.

Figure 13:
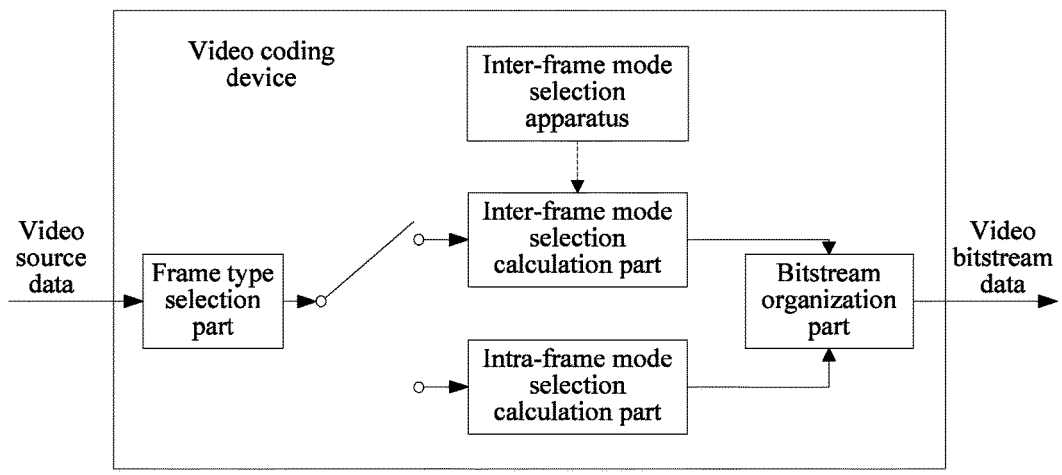
FIG. 13 is a schematic diagram of a video coding device according to an embodiment of the present disclosure.

FIG. 13 is a schematic diagram of a video coding device according to an embodiment of the present disclosure. As shown in FIG. 13, the video coding device mainly includes a frame type selection part, an inter-frame mode selection calculation part, an intra-frame mode selection calculation part, a bitstream organization part, and an inter-frame mode selection apparatus, where to-be-coded video source data that is input passes through the frame type selection part; if it is determined that the data is an I frame, the video coding device performs intra-frame mode selection calculation by using the intra-frame mode selection calculation part, and records an optimum coding mode and corresponding encoded data, and the bitstream organization part writes bitstream data and outputs the bitstream data; and if it is determined that the data is a GPB frame or a B frame, the inter-frame mode selection apparatus and the inter-frame mode selection calculation part work together to perform inter-frame mode selection calculation for the GPB frame or the B frame, and the bitstream organization part writes bitstream data and outputs the bitstream data. A specific method for performing inter-frame mode selection calculation is already introduced in the foregoing content of the embodiments of the present disclosure, and is not described in detail herein.

By using the inter-frame mode selection apparatus provided in the foregoing content of the embodiments of the present disclosure, the video coding device provided in this embodiment of the present disclosure effectively reduces calculation complexity of calculation for mode selection in a video coding process, thereby achieving an effect of improving a coding speed.

The sequence numbers of the foregoing embodiments of the present disclosure are merely for illustrative purposes, and are not intended to indicate priorities of the embodiments.

In the foregoing embodiments of the present disclosure, the description of the embodiments each has a focus. For a part that is not described in detail of an embodiment, reference may be made to a related description of another embodiment.

In the embodiments provided in this application, it should be understood that the disclosed apparatus may be implemented in another manner. The described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the devices or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the existing technology, or all or a part of the technical solutions may be implemented in a form of a software product. The computer software product is stored in a storage medium and includes several instructions for instructing a computer device (which may be a personal computer, a server, a network device, or the like) to perform all or a part of the steps of the methods described in the embodiments of the present disclosure. The foregoing storage medium includes various mediums that can store program code, such as a USB flash drive, a ROM, a RAM, a removable hard disk, a magnetic disk, or an optical disc.

The foregoing descriptions are merely specific embodiments of the present disclosure. It should be noted that a person of ordinary skill in the art may make modifications and variations without departing from the principle of the present disclosure, and these modifications and variations should be construed as falling within the scope of the present disclosure.

What is claimed is:

1. An inter-frame mode selection method for video coding, the inter-frame mode selection method comprising:

step (a): determining a current optimum coding mode and coding overhead of a coding unit $CU_{Depth}$ in a current depth Depth, an initial value of the current depth Depth being 1;

step (b): dividing the coding unit $CU_{Depth}$ into multiple coding subunits having a depth Depth +1, and recursively performing step (a) to step (d) for each of the coding subunits until the depth of the coding subunit reaches a preset maximum depth or satisfies a division stopping condition, to determine an optimum coding mode and a coding overhead of each coding subunit;

step (c): comparing a sum of coding overheads of the multiple coding subunits with the current coding overhead of the coding unit $CU_{Depth}$; and step (d): if the current coding overhead of the coding unit $CU_{Depth}$ is greater than the sum of the coding overheads of the multiple coding subunits, determining that an optimum coding mode of the coding unit $CU_{Depth}$ is a coding mode, which is optimum after the coding unit $CU_{Depth}$ is divided into the multiple coding subunits; otherwise, determining that an optimum coding mode of the coding unit $CU_{Depth}$ is the coding mode, which is optimum before the coding unit $CU_{Depth}$ is divided into the multiple coding subunits, in a case in which calculation of the coding overhead required for coding the coding unit $CU_{Depth}$ having the current depth Depth is to be skipped, steps (b), (c), and (d) are sequentially invoked, and in a case in which the calculation of the coding overhead required for coding the coding unit Depth having the current depth $CU_{Depth}$ is not to be skipped, steps (a), (b), (c), and (d) are sequentially invoked, wherein the inter-frame mode selection method further comprises: determining an optimum coding mode of a target coding unit in the following manner, wherein the target coding unit is the coding unit $CU_{Depth}$ or the coding subunit:

determining whether calculation of a coding overhead required for coding the target coding unit according to a current mode is to be skipped;

in a case in which it is determined that the calculation of the coding overhead required for coding the target coding unit according to the current mode is to be skipped, skipping the calculation of the coding overhead required for coding the target coding unit according to the current mode, and selecting a smallest coding overhead from first coding overheads, wherein the first coding overheads are calculated coding overheads required for coding the target coding unit according to previous modes, and the previous modes are modes before the current mode;

determining whether target parameters when the target coding unit is coded by using a mode corresponding to the smallest coding overhead satisfy a preset condition, wherein the preset condition represents that it is predetermined that a coding mode of the target coding unit is a skip mode; and in a case in which it is determined that the target parameters satisfy the preset condition, determining that the optimum coding mode of the target coding unit is the mode corresponding to the smallest coding overhead.

2. The inter-frame mode selection method according to claim 1, wherein the inter-frame mode selection method further comprises: determining, in the following manner, whether the calculation of the coding overhead required for coding the coding unit $CU_{Depth}$ having the current depth Depth is to be skipped:

acquiring coding units CU' that are coded before the coding unit $CU_{Depth}$ and are adjacent to the coding unit $CU_{Depth}$ in a time domain and/or a space domain and depths of the coding unit CU's;

determining whether $N_c$ first coding units exist among the coding units CU', wherein $N_c$ is a first preset parameter, and a depth of the first coding unit is greater than the current depth Depth; and in a case in which it is determined that $N_c$ first coding units exist among the coding units CU', determining that the calculation of the coding overhead required for coding the coding unit $CU_{Depth}$ is to be skipped.

3. The inter-frame mode selection method according to claim 2, wherein the determining whether $N_c$ first coding units exist among the coding units CU' comprises:

determining whether $C \geq N_c$ is valid, wherein $$C = \sum_i C_i,$$

$$0 \leq i \leq 5,$$

$$C_i = \begin{cases} 1, & Depth_i > Depth \\ 0, & Depth_i \leq Depth \text{ or } CU'_i \text{ does not exist} \end{cases},$$

and Depth$_i$ is a depth of a coding unit CU,' among the coding units CU' ; and in a case in which it is determined that $C \geq N_c$ is valid, determining that $N_c$ first coding units exist among the coding units CU'.

4. A video coding method, comprising:

receiving to-be-coded video source data;

determining a coding frame type of each frame in the video source data, to obtain an inter-frame predictive frame and an intra-frame predictive frame;

determining a coding mode of the intra-frame predictive frame, and determining a coding mode of the inter-frame predictive frame by using a preset method, wherein the preset method is an inter-frame mode selection method for video coding including:

step (a): determining a current optimum coding mode and coding overhead of a coding unit $CU_{Depth}$ in a current depth Depth, an initial value of the current depth Depth being 1;

step (b): dividing the coding unit $CU_{Depth}$ into multiple coding subunits having a depth Depth +1, and recursively performing step (a) to step (d) for each of the coding subunits until the depth of the coding subunit reaches a preset maximum depth or satisfies a division stopping condition, to determine an optimum coding mode and a coding overhead of each coding subunit;

step (c): comparing a sum of coding overheads of the multiple coding subunits with the current coding overhead of the coding unit $CU_{Depth}$; and step (d): if the current coding overhead of the coding unit $CU_{Depth}$ is greater than the sum of the coding overheads of the multiple coding subunits, determining that an optimum coding mode of the coding unit $CU_{Depth}$ is a coding mode, which is optimum after the coding unit $CU_{Depth}$ is divided into the multiple coding subunits; otherwise, determining that an optimum coding mode of the coding unit $CU_{Depth}$ is the coding mode, which is optimum before the coding unit $CU_{Depth}$ is divided into the multiple coding subunits, in a case in which calculation of the coding overhead required for coding the coding unit $CU_{Depth}$ having the current depth Depth is to be skipped, steps (b), (c), and (d) are sequentially invoked, and in a case in which the calculation of the coding overhead required for coding the coding unit Depth having the current depth $CU_{Depth}$ is not to be skipped, steps (a), (b), (c), and (d) are sequentially invoked; and coding the intra-frame predictive frame by using a first mode, and coding the inter-frame predictive frame by using a second mode, wherein the first mode is the determined coding mode of the intra-frame predictive frame, and the second mode is the coding mode, which is determined by using the preset method, of the inter-frame predictive frame, wherein the inter-frame mode selection method further comprises: determining an optimum coding mode of a target coding unit in the following manner, wherein the target coding unit is the coding unit $CU_{Depth}$ or the coding subunit:

determining whether calculation of a coding overhead required for coding the target coding unit according to a current mode is to be skipped;

in a case in which it is determined that the calculation of the coding overhead required for coding the target coding unit according to the current mode is to be skipped, skipping the calculation of the coding overhead required for coding the target coding unit according to the current mode, and selecting a smallest coding overhead from first coding overheads, wherein the first coding overheads are calculated coding overheads required for coding the target coding unit according to previous modes, and the previous modes are modes before the current mode;

determining whether target parameters when the target coding unit is coded by using a mode corresponding to the smallest coding overhead satisfy a preset condition, wherein the preset condition represents that it is predetermined that a coding mode of the target coding unit is a skip mode; and in a case in which it is determined that the target parameters satisfy the preset condition, determining that the optimum coding mode of the target coding unit is the mode corresponding to the smallest coding overhead.

5. The inter-frame mode selection method according to claim 4, wherein the inter-frame mode selection method further comprises: determining, in the following manner, whether the calculation of the coding overhead required for coding the coding unit $CU_{Depth}$ having the current depth Depth is to be skipped:

acquiring coding units CU' that are coded before the coding unit $CU_{Depth}$ and are adjacent to the coding unit $CU_{Depth}$ in a time domain and/or a space domain and depths of the coding unit CU's;

determining whether $N_c$ first coding units exist among the coding units CU', wherein $N_c$ is a first preset parameter, and a depth of the first coding unit is greater than the current depth Depth; and in a case in which it is determined that $N_c$ first coding units exist among the coding units CU', determining that the calculation of the coding overhead required for coding the coding unit $CU_{Depth}$ is to be skipped.

6. The inter-frame mode selection method according to claim 5, wherein the determining whether $N_c$ first coding units exist among the coding units CU' comprises:
determining whether $C \geq N_c$ is valid, wherein $$C = \sum_i C_i, 0 \leq i \leq 5, C_i = \begin{cases} 1, Depth_i > Depth \\ 0, Depth_i \leq Depth \text{ or } CU'_i \text{ does not exist} \end{cases},$$

and $Depth_i$ is a depth of a coding unit $CU_i$', among the coding units CU'; and
in a case in which it is determined that $C \geq N_c$ is valid, determining that $N_c$ first coding units exist among the coding units CU'.

7. An inter-frame mode selection apparatus for video coding, an initial value of a current depth Depth being 1, and the inter-frame mode selection apparatus comprising:
an invoking unit, configured to: in a case in which calculation of a coding overhead required for coding a coding unit $CU_{Depth}$ having the current depth Depth is to be skipped, sequentially invoke a processing unit, a comparing unit, and a second determining unit, and in a case in which the calculation of the coding overhead required for coding the coding unit $CU_{Depth}$ having the current depth Depth is not to be skipped, sequentially invoke a first determining unit, the processing unit, the comparing unit, and the second determining unit;
the first determining unit, configured to determine a current optimum coding mode and coding overhead of the coding unit $CU_{Depth}$ in the current depth Depth;
the processing unit, configured to divide the coding unit $CU_{Depth}$ into multiple coding subunits having a depth Depth+1, and recursively invoke the invoking unit, the first determining unit, the processing unit, the comparing unit, and the second determining unit for each of the coding subunits until the depth of the coding subunit reaches a preset maximum depth or satisfies a division stopping condition, to determine an optimum coding mode and a coding overhead of each coding subunit;
the comparing unit, configured to compare a sum of coding overheads of the multiple coding subunits with the current coding overhead of the coding unit $CU_{Depth}$; and
the second determining unit, configured to: in a case in which it is determined through comparison that the current coding overhead of the coding unit $CU_{Depth}$ is greater than the sum of the coding overheads of the multiple coding subunits, determine that an optimum coding mode of the coding unit $CU_{Depth}$ is a coding mode, which is optimum after the coding unit $CU_{Depth}$ is divided into the multiple coding subunits; otherwise, determine that an optimum coding mode of the coding unit $CU_{Depth}$ is the coding mode, which is optimum before the coding unit $CU_{Depth}$ is divided into the multiple coding subunits,
wherein an optimum coding mode of a target coding unit is determined by using the following modules, wherein the target coding unit is the coding unit $CU_{Depth}$ or the coding subunit:

a first judging module, configured to determine whether calculation of a coding overhead required for coding the target coding unit according to a current mode is to be skipped;
a processing module, configured to: in a case in which the first judging module determines that the calculation of the coding overhead required for coding the target coding unit according to the current mode is to be skipped, skip the calculation of the coding overhead required for coding the target coding unit according to the current mode, and select a smallest coding overhead from first coding overheads, wherein the first coding overheads are calculated coding overheads required for coding the target coding unit according to previous modes, and the previous modes are modes before the current mode;
a second judging module, configured to determine whether target parameters when the target coding unit is coded by using a mode corresponding to the smallest coding overhead satisfy a preset condition, wherein the preset condition represents that it is predetermined that a coding mode of the target coding unit is a skip mode; and
a determining module, configured to: in a case in which it is determined that the target parameters satisfy the preset condition, determine that the mode corresponding to the smallest coding overhead is a mode to be used for coding the target coding unit.

8. The inter-frame mode selection apparatus according to claim 7, wherein the inter-frame mode selection apparatus further comprises:
an acquiring unit, configured to acquire coding units $CU_{Depth}$ that are coded before the coding unit $CU_{Depth}$ and are adjacent to the coding unit CU' in a time domain and/or a space domain and depths of the coding units CU'; and
a judging unit, configured to determine whether $N_c$ first coding units exist among the coding units CU', wherein $N_c$ is a first preset parameter, and a depth of the first coding unit is greater than the current depth Depth; and
in a case in which it is determined that $N_c$ first coding units exist among the coding units CU', determine that the calculation of the coding overhead required for coding the coding unit $CU_{Depth}$ is to be skipped.

9. The inter-frame mode selection apparatus according to claim 8, wherein the judging unit is configured to determine whether $C \geq N_c$ is valid, wherein $$C = \sum_i C_i, 0 \leq i \leq 5, C_i = \begin{cases} 1, Depth_i > Depth \\ 0, Depth_i \leq Depth \text{ or } CU'_i \text{ does not exist} \end{cases},$$

and $Depth_i$ is a depth of a coding unit CU'; among the coding units CU'; and in a case in which it is determined that $C \geq N_c$ is valid, determine that $N_c$ first coding units exist among the coding units CU'.

* * * * *